(12) United States Patent
Kioski et al.

(10) Patent No.: US 12,222,569 B2
(45) Date of Patent: Feb. 11, 2025

(54) CABLE ROUTING STORAGE ASSEMBLIES FOR DATA COMMUNICATION SYSTEMS

(71) Applicant: Telect, Inc., Liberty Lake, WA (US)

(72) Inventors: Bryan Joseph Kioski, Spokane, WA (US); Walter Dean Takisaki, Spokane Valley, WA (US)

(73) Assignee: Telect, Inc., Liberty Lake, WA (US)

( * ) Notice: Subject to any disclaimer, the term of this patent is extended or adjusted under 35 U.S.C. 154(b) by 152 days.

(21) Appl. No.: 17/718,675

(22) Filed: Apr. 12, 2022

(65) Prior Publication Data

US 2023/0324638 A1    Oct. 12, 2023

(51) Int. Cl.
*G02B 6/00* (2006.01)
*G02B 6/44* (2006.01)

(52) U.S. Cl.
CPC ......... *G02B 6/4452* (2013.01); *G02B 6/4455* (2013.01)

(58) Field of Classification Search
CPC ............... G02B 6/4452; G02B 6/4455; G02B 6/44526; G02B 6/00
See application file for complete search history.

(56) References Cited

U.S. PATENT DOCUMENTS

| 10,585,258 B2* | 3/2020 | Wentworth | ............ G02B 6/447 |
| 2010/0322579 A1 | 12/2010 | Cooke et al. | |
| 2016/0062050 A1 | 3/2016 | Giraud et al. | |
| 2016/0077298 A1 | 3/2016 | Wiltjer et al. | |
| 2017/0082815 A1* | 3/2017 | Takeuchi | ............. G02B 6/4452 |
| 2018/0100976 A1 | 4/2018 | Patel et al. | |

FOREIGN PATENT DOCUMENTS

WO    2020264340    12/2020

OTHER PUBLICATIONS

The PCT Search Report and Written Opinion mailed Oct. 2, 2023 for PCT application No. PCT/US23/65521, 9 pages.
AFL Hyperscale, "U-Series 1RU Housing" retrieved from <https://www.aflhyperscale.com/product/u-series-1ru-housing/> on May 5, 2022, 14 pages.
Codecom, "Codecom Rack Solutions", retrieved from <https://codecom.co/video_category/public/?wvideo=qbbojs02kr> on May 5, 2022, 27 page.

(Continued)

*Primary Examiner* — Jennifer Doan
(74) *Attorney, Agent, or Firm* — Lee & Hayes, P.C.

(57) ABSTRACT

A cable routing storage assembly for a data communication system chassis. The assembly including a shuttle including a base portion spanning between a first side of the shuttle and a second side of the shuttle. A slot is defined within the base portion and arranged between the first side and the second side. The slot extending from the back end of the shuttle along a portion of a length of the shuttle to a point proximate to a front end of the shuttle such that the base portion at the back end of the shuttle is separated between the first side and the second side. The slot being sized to slideably receive a mounting structure disposed in the chassis. A handle extends from a front end of the shuttle in front of the slot. The handle being configured to displace the shuttle relative to the chassis.

20 Claims, 14 Drawing Sheets

(56) References Cited

OTHER PUBLICATIONS

Commscope, "FACT optical distribution frame (ODF) solution, Unlocking the potential of every new day", retrieved on May 5, 2022, 22 pages.
Commscope, "FPX Series Fiber Panels", retrieved on May 5, 2022, 14 pages.
Corning, Optical Communications "Centrix—Extreme flexibility and simplicity by various cabinets and management frames" retrieved from <https://www.corning.com/optical-communications/emea/en/home/applications/central-office-headend-solutions/solutions/centrix/centrix-cabinets.html> on May 5, 2022, 5 pages.
Huber and Suhner, "Lisa Double Access", retrieved from <https://www.hubersuhner.com/en/solutions/data-center/products/lisa-centralised-cross-connects-en/lisa-solutions/lisa-double-access-en> on May 5, 2022, 3 pages.

* cited by examiner

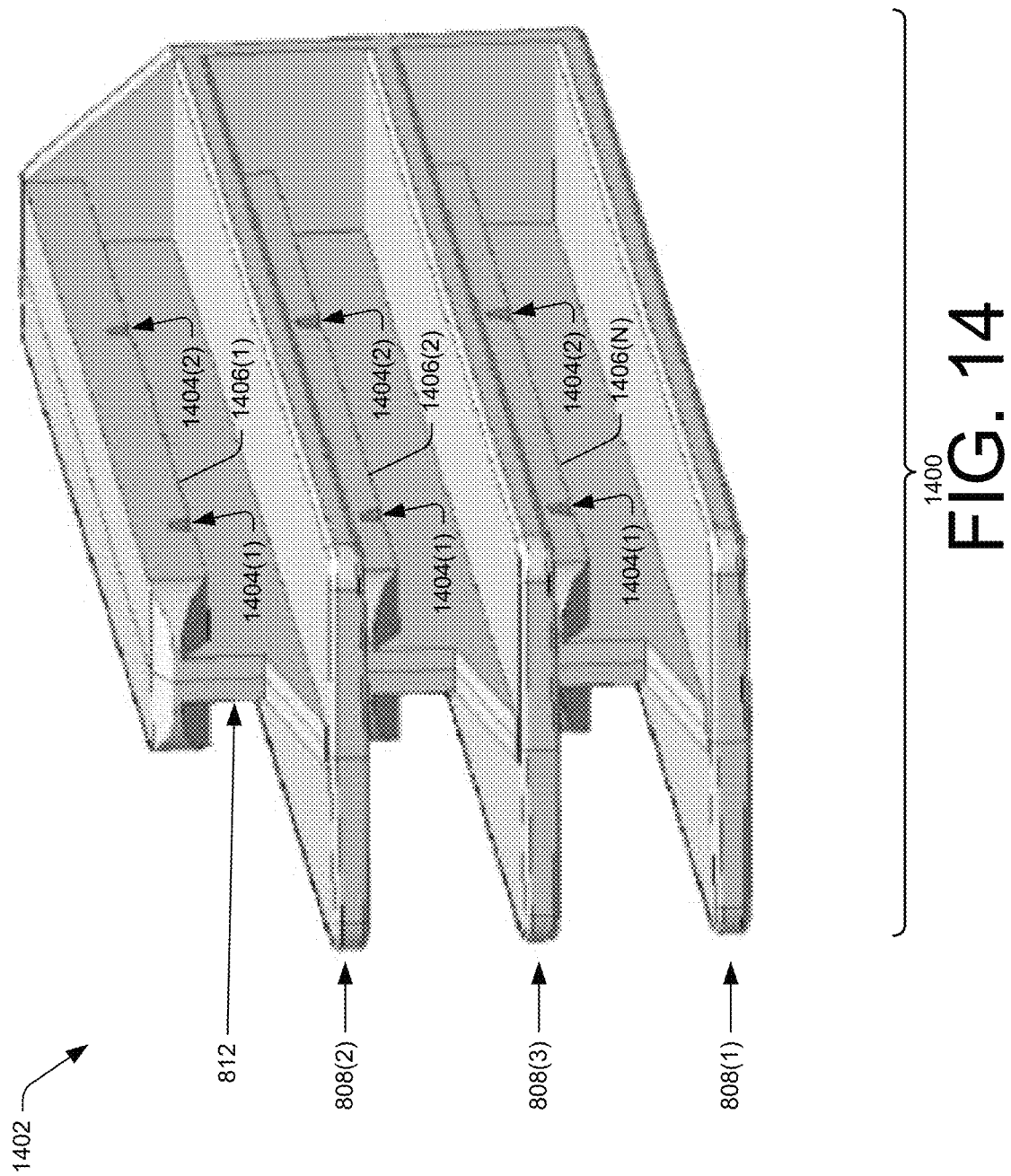

CABLE ROUTING STORAGE ASSEMBLIES FOR DATA COMMUNICATION SYSTEMS

BACKGROUND

An important consideration in data communication equipment is circuit density. Most fiber optic splice enclosures have limited space. Therefore, there is a need to reduce the size of data communication equipment and install as much data communication equipment as possible in a relatively small space in fiber optic splice enclosures.

For data communication manufacturers, making high density enclosures can be a challenging process in which engineers develop enclosures to meet the high density needs of the fiber optic splice enclosures while protecting optical fiber lines, maintaining bend radii of the optical fiber lines, and managing massive amounts of the optical fiber lines. This is particularly true for optical fiber communication lines, where the engineers create total front access (TFA) frames having a high density of optical fibers. Frames exist having a high-density capacity, but the frames are not TFA, and instead require access to the backs of the frames. For example, in the case where the frame has a high-density capacity, the splices are done at the back of the frame. Thus, a user must first splice cables at the back of the frame, and then traverse around a frame to get to the front of the frame to patch the cables at the front of the frame the user is working on.

Another important consideration in data communication equipment is making enclosures that are total front access that are to be deployed in customer applications that prevent or limit access to the rear or back of the data communication equipment. For example, customer applications may prevent or limit access to the rear of fiber distribution panels to economize floor space. Therefore, there is a desire to maximize margins by increasing a density of optical fibers disposed in total front access enclosures that are deployable in customer applications (e.g., co-location site applications, outside plant cabinet applications, edge data center applications, etc.) that prevent or limit access to the rear or back of the data communication equipment.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 14 illustrates a perspective view of another example mounting structure according to an embodiment of this disclosure.

DETAILED DESCRIPTION

Overview

Figure 1:
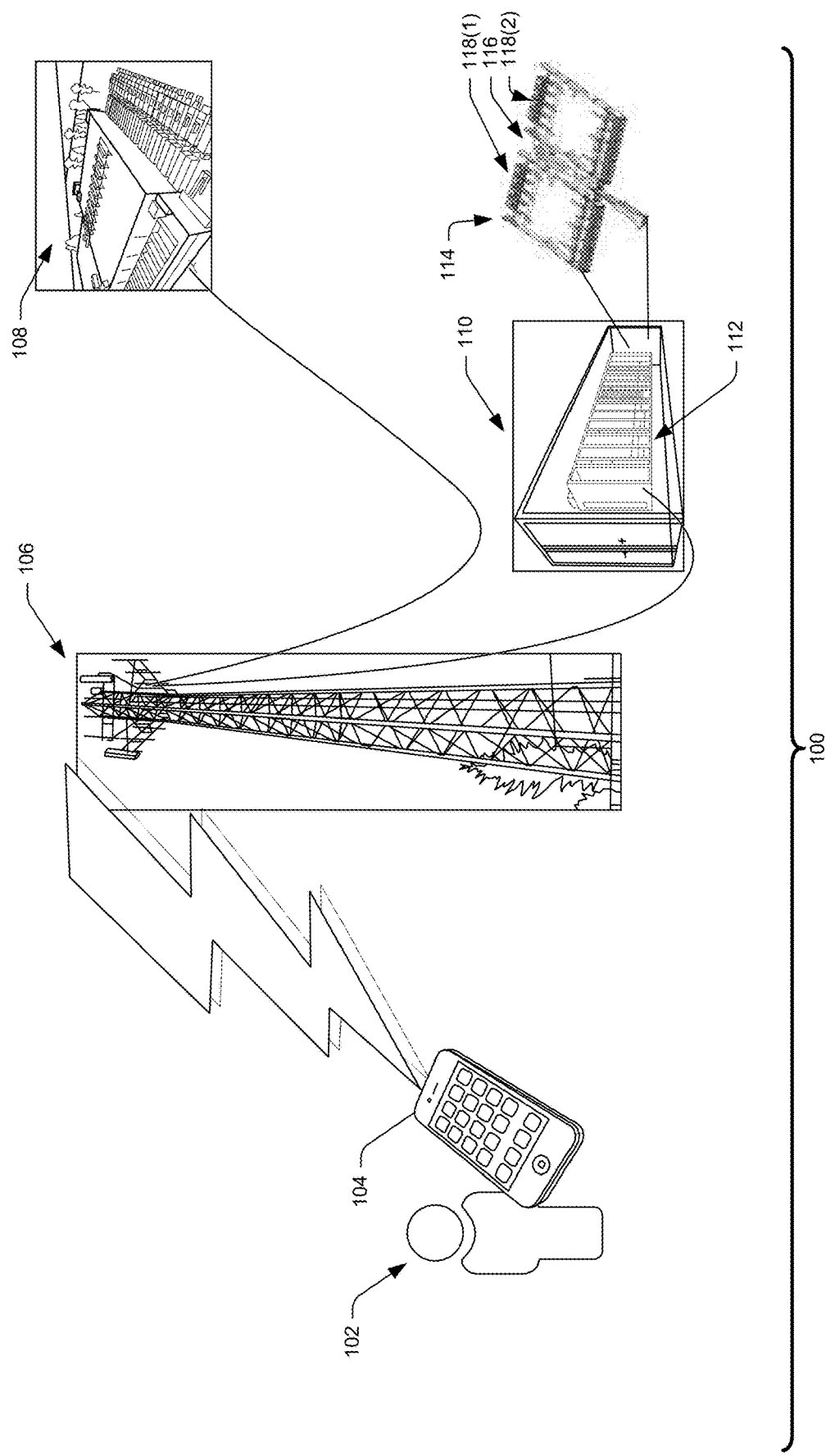
FIG. 1 illustrates an example data communication environment involving a user communicating data via a computing device wirelessly connected to a cell tower hardwired to a data center.

This disclosure is directed to cable routing storage assemblies for data communication systems. The cable routing storage assemblies are configured to be horizontally disposed in a chassis and include a shuttle that is cantilevered to one or more cassettes to economize space and maximize circuit density (e.g., maximize a quantity of fiber terminations) in the chassis. The shuttle is slideably receivable with a mounting structure disposed in the chassis such that a slot disposed in the shuttle slideably interfaces with the mounting structure.

The shuttle is supported in the chassis by the mounting structure and the first and second cassettes are cantilevered to the shuttle such that the shuttle and first and second cassettes are coplanar and horizontally disposed in the chassis. The first and second cassettes are disposed coplanarly with the shuttle to allow for accessing connectors (e.g., LC connectors, MPO connectors, etc.) of optical fiber connections fastened in the first and second cassettes and/or to allow for accessing fiber tails (e.g., pre-terminated fiber tails) of optical fiber connections fastened in the shuttle without accessing the back of the chassis. While the disclosure describes "a" or "the" data communication system, the article (e.g., "a," "an," or "the") used preceding "data communication system" is not intended to indicate a limitation of the features of the system itself, unless otherwise so stated. Indeed, multiple embodiments of a data communication system may be possible by using one or more of the various features and concepts in varying implementations and/or combinations.

For example, while the figures may depict an embodiment of a data communication system disposed in customer applications (e.g., co-location sites, outside plant cabinets, edge data centers, etc.) that are total front access, it is contemplated that one or more features and concepts described herein as related to the data communication system may be implemented in other embodiments, such as, for example, an embodiment of the features for total front access of optical fiber connections in inside plant environments, outside plant environments, central data communication locations, etc. Further, while the figures may depict data communication systems that are total front access applications, it is contemplated that the data communication systems may be implemented in other embodiments, such as, for example, front and back access applications. Moreover, while the disclosure describes the data communication system configured to splice and/or patch optical fiber terminations, the data communication system may be configured for any fiber connectivity and/or fiber management (e.g., splitting wavelength, splitting power, test ports, etc.), for example.

Generally, a splice termination may be two separate fibers (e.g., separate pieces of glass) that are joined together through a splice (e.g., joining two fibers end-to-end). And, a patch termination may be separate fibers (e.g., separate cables) terminated in a connector (e.g., Lucent Connectors (LCs), subscriber connectors (SC), etc.) having an end condition (e.g., an angle-polished connector (APC) end condition or an ultra-polished connector (UPC) end condition). In the patch termination, the separate fibers terminated in the connector may then be inserted into an adapter (e.g., a coupler), where the adapter may be configured such that an additional cable (e.g., jumper) may be inserted into the opposite end providing a continuous path for light to pass through.

A cable routing storage assembly for a data communication system chassis, as disclosed herein, may include a shuttle including a first coupling member disposed on a first side of the shuttle and a second coupling member disposed on a second side of the shuttle. The first coupling member is configured to couple to a first cooperating coupling member disposed on a side of a first cassette. The second coupling member is configured to couple to a second cooperating coupling member disposed on a side of a second cassette. When the first coupling member of the shuttle is coupled to the first cooperating coupling member of the first cassette and the second coupling member of the shuttle is coupled to the second cooperating coupling member of the second cassette, the first cassette and the second cassette coupled to the shuttle are coplanar.

A cable routing storage assembly for a data communication system as disclosed herein may include a chassis sized to be accommodated in a frame. The chassis includes an access side, and a mounting structure disposed in the access side. A shuttle includes a first coupling member disposed on a first side of the shuttle and a second coupling member disposed on a second side of the shuttle. The shuttle includes a slot defined within a base portion of the shuttle and arranged between the first side and the second side of the shuttle. The slot extending from a back end of the shuttle along a portion of a length of the shuttle to a point proximate to a front end of the shuttle such that the base portion at the back end of the shuttle is separated between the first side and the second side. The slot is sized to slideably receive a mounting structure disposed in the chassis. When the first coupling members is coupled to a first cassette and the second coupling member is coupled to a second cassette, the first cassette and the second cassette are coplanar. Moreover, when the slot slideably receives the mounting structure, the mounting structure supports the at least one shuttle, the first cassette coupled to the at least one shuttle, and the second cassette coupled to the at least one shuttle in the chassis A cable routing storage assembly for a data communication system, as disclosed herein, may include a shuttle having a base portion spanning between a first side of the shuttle and a second side of the shuttle and a slot defined with the base portion and arranged between a first side of the shuttle and a second side of the shuttle. The slot extending from a back end of the shuttle along a portion of a length of the shuttle to a point proximate to a front end of the shuttle such that the base portion at the back end of the shuttle is separated between the first side and the second side. The slot being sized to slideably receive a mounting structure disposed in the chassis. A handle extending from the front end of the shuttle and in front of the slot may be configured to displace the shuttle relative to the chassis.

Illustrative Embodiments of Cable Routing Storage Assemblies for Data Communication Systems FIG. 1 illustrates an example data communication environment 100 involving a user 102 using a device 104 (e.g., phone, tablet, personal computer, gaming console, tv, etc.) wirelessly connected to a cell tower 106 which is hardwired to a data center 108 and/or hardwired to an edge data center 110. The edge data center 110 may be a relatively small data center having a relatively smaller square footage floor space compared to the data center 108. The data center 108 may be arranged in a campus having hundreds of thousands of square feet of floor space. The edge data center 110 may be arranged in a shipping container, a small building, a co-location site, an outside plant cabinet, etc. having relatively smaller available square footage as compared to the data center 108 that is arranged in a campus having hundreds of thousands of square feet of floor space. In one example, the edge data center 110 may be located relatively closer to the cell tower 106 that is wirelessly communicating with the device 104 rather than the data center 108 remotely located farther away from the cell tower 106. In another example, the edge data center 110 may be located relatively closer to a local data communication facility communicating with the device 104 rather than the data center 108 remotely located farther away from the local data communication facility. The edge data center 110 may be located relatively closer to the cell tower 106 to provide for faster processing of data. Thus, the edge data center 110 provides low latency responses to the device 104 for the user 102 because the edge data center 110 is located closer (i.e., within a shorter distance) to the cell tower 106 providing the user 102 with cell coverage.

The edge data center 110 may include data communication systems 112 that employ chassis that are total front access. The total front access chassis may be utilized in the edge data center 110 to economize floor space available in the relatively smaller sized edge data center 110.

In an embodiment, the total front access chassis disposed in the edge data center 110 may be a 19-inch 1 Rack Unit (RU) chassis, though it is contemplated that standard sizes may vary, and thus the chassis size may have dimensions other than the aforementioned "19-inch" 1 RU (e.g., 2 RU, 4 RU, 6 RU, etc). The total front access chassis may include one or more cable routing storage assemblies 114 configured to splice and/or patch optical fiber terminations in the confined space of the edge data center 110. In order to economize space and maximize circuit density (e.g., maximize a quantity of fiber terminations) in the edge data center 110, the one or more cable routing storage assemblies 114 are configured to be disposed horizontally in the chassis. Further, in order to economize space and maximize circuit density the one or more cable routing storage assemblies 114 include a shuttle 116 and first and second cassettes 118(1) and 118(2), where the shuttles 116 are cantilevered to the first and second cassettes 118(1) and 118(2). Because the one or more cable routing storage assemblies 114 are disposed horizontally in chassis and the shuttles 116 are cantilevered to the first and second cassettes 118(1) and 118(2), the one or more cable routing storage assemblies 114 economize space and maximize circuit density. For example, in an embodiment, because the one or more cable routing storage assemblies 114 are disposed horizontally in the chassis, where the shuttles 116 are cantilevered to the first and second cassettes 118(1) and 118(2), the one or more cable routing storage assemblies 114 may provide for a circuit density of at least about 144 fiber terminations in a 19-inch 1 RU chassis.

Figure 2:
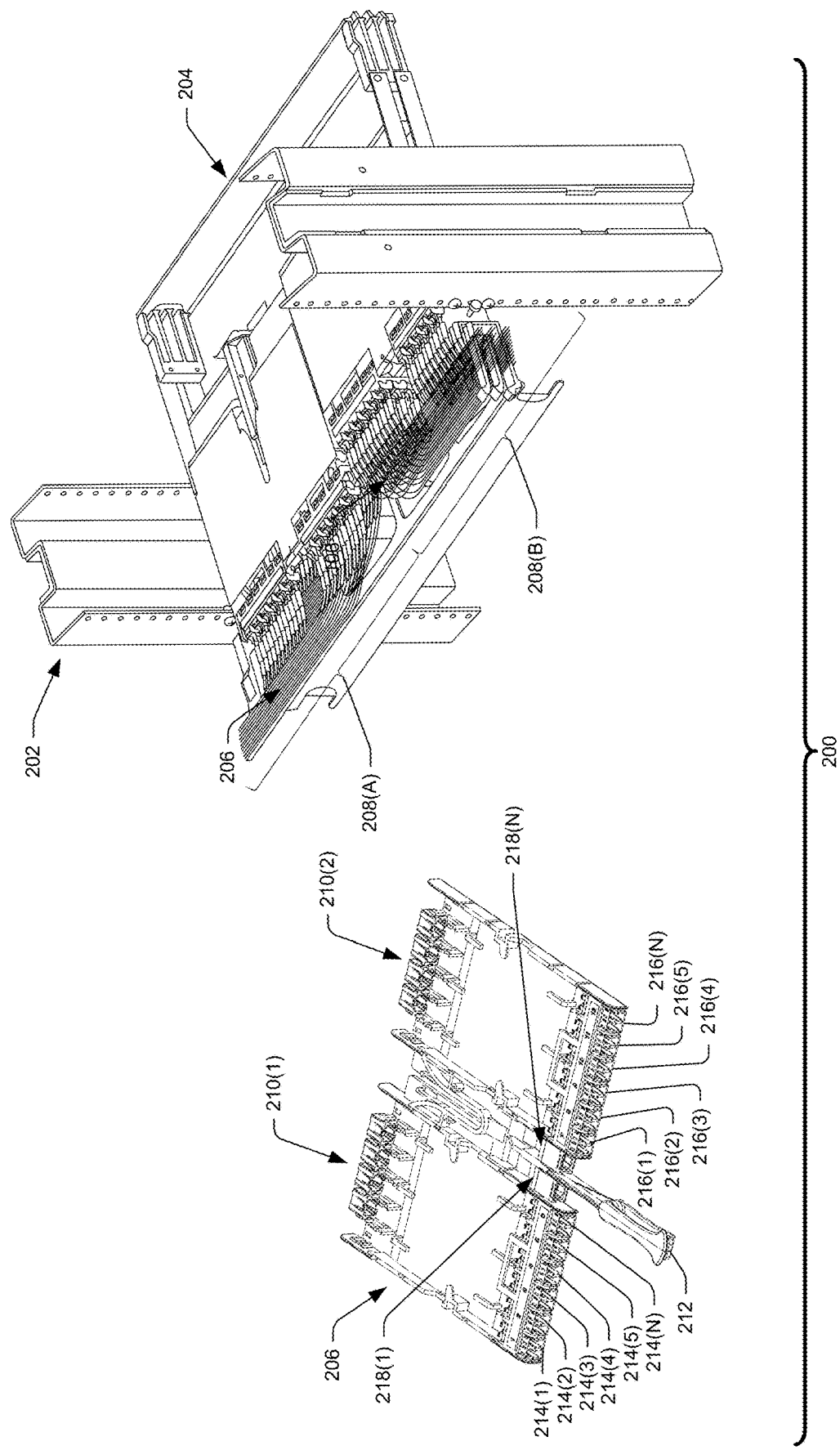
FIG. 2 illustrates an example data communication system according to an embodiment of this disclosure.

FIG. 2 illustrates an example data communication system 200 according to an embodiment of this disclosure. The data communication system 200 may be used in the data communication environment 100 of FIG. 1. The data communication system 200 may be used in co-location site applications, outside plant cabinet applications, edge data center applications, etc. The data communication system 200 may be used in total front access enclosures. The total front access enclosures may be used in the co-location site applications, outside plant cabinet applications, edge data center applications, etc. The data communication system 200 may include fiber optic components. For example, the data communication system 200 may include a frame 202, a chassis 204, and one or more cable routing storage assemblies 206. The one or more cable routing storage assemblies 206 may be the same as the one or more cable routing storage assemblies 114 of FIG. 1. The one or more cable routing storage assemblies 206 may be removeably received horizontally by the chassis 204, and the chassis 204 may be disposed in the frame 202. As indicated previously, in an embodiment, the chassis 204 may be a 19-inch 1 Rack Unit (RU) chassis. While FIG. 2 illustrates the chassis 204 including a total front access chassis, the chassis 204 may include front access and back access.

The chassis 204 may have a left front access side 208(a) and a right front access side 208(b). The one or more cable routing storage assemblies 206 are horizontally arrangeable in both the left front access side 208(a) and the right front access side 208(b). The one or more cable routing storage assemblies 206 may be configured to splice and/or patch optical fiber terminations. The one or more cable routing storage assemblies 206 may include first and second cassettes 210(1) and 210(2). The first and second cassettes 210(1) and 210(2) may be the same as the first and second cassettes 118(1) and 118(2).

The first and second cassettes 210(1) and 210(2) may be releasably engaged with a shuttle 212. While FIG. 2 illustrates the first and second cassettes 210(1) and 210(2) are releasably engaged with the shuttle 212, the first and second cassettes 210(1) and 210(2) may be fixed to the shuttle 212. For example, the first and second cassettes 210(1) and 210(2) may be integrally formed with the shuttle 212. The first cassette 210(1) may include a plurality of connectors 214(1), 214(2), 214(3), 214(4), 214(5), and 214(n) fastened in a first end of the first cassette 210(1). The second cassette 210(2) may include a plurality of connectors 216(1), 216(2), 216(3), 216(4), 216(5), and 216(n) fastened in a first end of the second cassette 210(2). The plurality of connectors 214(1)-214(n) and 216(1)-216(n) are configured to receive separate fibers terminated in the plurality of connectors 214(1)-214(n) and 216(1)-216(n) and the plurality of connectors 214(1)-214(n) and 216(1)-216(n) provide for additional cables (e.g., jumpers) respectively to be inserted into opposite ends thereof providing continuous paths for light to pass through. The plurality of connectors may include a plurality of LC connectors. The LC connectors may be pre-terminated LC connectors. For example, the LC connectors may be pre-terminated at a time of manufacturing the first and second cassettes 210(1) and 210(2) at a facility. While FIG. 2 illustrates the plurality of optical connectors including a plurality of LC connectors, the plurality of connectors may include a plurality of other connectors. For example, the plurality of connectors may be SC connectors which further may be pre-terminated SC connectors. For example, the SC connectors may be pre-terminated at a time of manufacturing the first and second cassettes 210(1) and 210(2) at a facility.

The shuttles 212 may include first and second input stations 218(1) and 218(2) disposed in front ends of the shuttles 212 adjacent to the plurality of connectors 214(1) and 214(n) fastened in the first ends of the first and second cassettes 210(1) and 210(2). The first and second input stations 218(1) and 218(2) are configured to fasten optical fiber interfaces (e.g., adapters (e.g., MPO adapters), pre-terminated fiber tails, or strain relief mechanisms). Each of the adapters, pre-terminated fiber tails, or the strain relief mechanisms fastened in the first and second input stations 218(1) and 218(2) may bring in a quantity of at least about 12 fiber terminations.

The 12 fiber terminations of the first input station 218(1) may be communicatively coupled (e.g., optically coupled) to the first plurality of connectors 214(1) fastened in the front end of the first cassette 210(1). The 12 fiber terminations of the second input station 218(2) may be communicatively coupled (e.g., optically coupled) to the second plurality of connectors 216(1)-216(n) fastened in the front end of the second cassette 210(2). While FIG. 2 illustrates the first and second plurality of connectors 214(1)-214(n) and 216(1)-216(n) fastened in the front ends of the first and second cassettes 210(1) and 210(2), the first and second plurality of connectors 214(1)-214(n) and 216(1)-216(n) may be fastened in back ends of the first and second cassettes 210(1) and 210(2). Moreover, while FIG. 2 illustrates the first and second plurality of connectors 214(1)-214(n) and 216(1)-216(n) fastened in the front ends of the first and second cassettes 210(1) and 210(2), additional connectors may be fastened in the back ends of the first and second cassettes 210(1) and 210(2) along with the first and second plurality of connectors 214(1)-214(n) and 216(1)-216(n) fastened in the front ends of the first and second cassettes 210(1) and 210(2).

Figure 3:
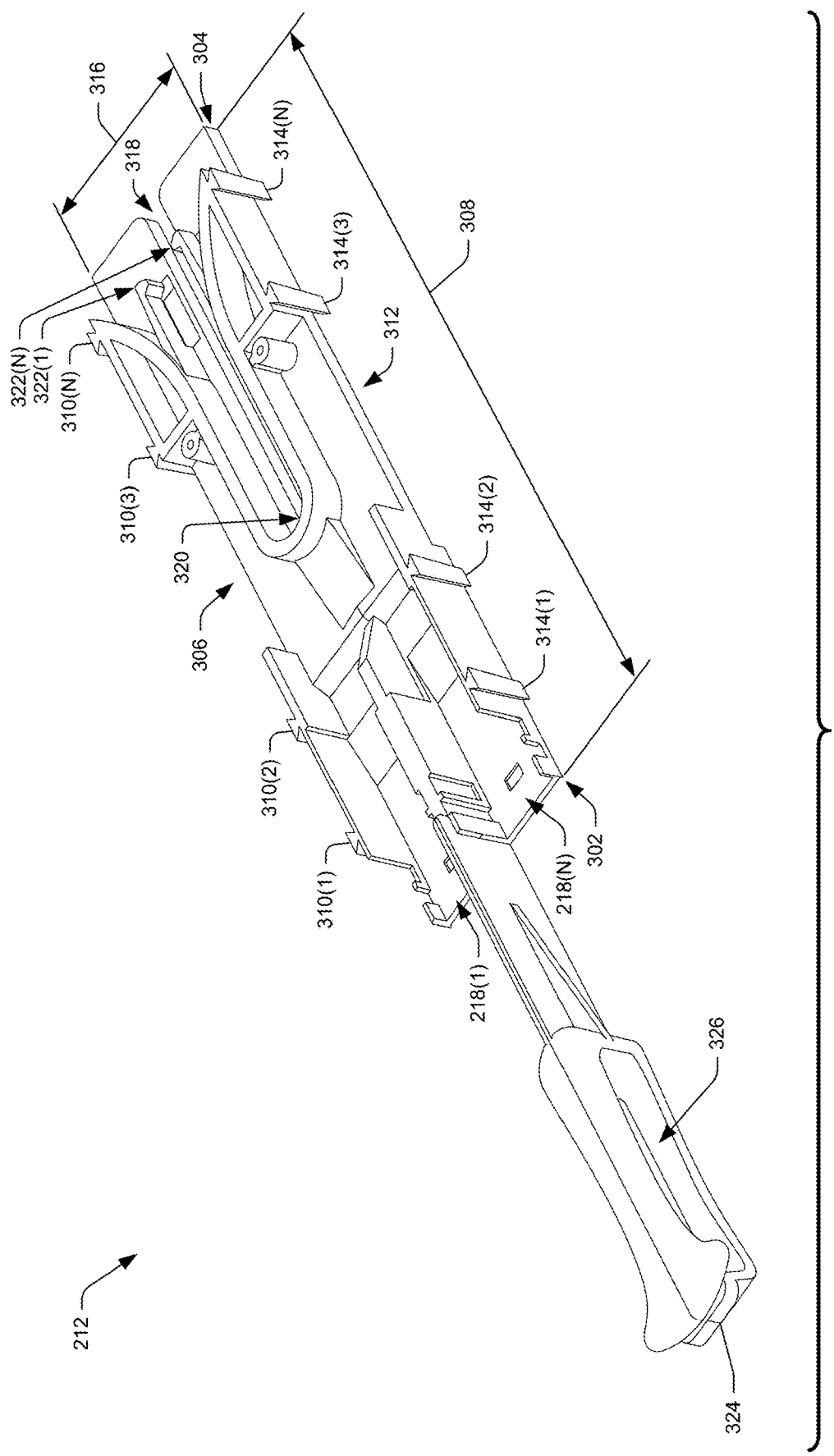
FIG. 3 illustrates a top perspective view of an example shuttle useable in the data communication system illustrated in FIG. 2 according to an embodiment of this disclosure.

FIG. 3 illustrates a top perspective view 300 of the shuttle 212 of FIG. 2 according to an embodiment of this disclosure. The shuttle 212 includes a front end 302 opposite a back end 304 and a first side 306 that extends a length 308 between the front end 302 and the back end 304. The shuttle 212 includes a first plurality of coupling members 310(1), 310(2), 310(3), and 310(n) disposed along the first side 306 of the shuttle 212 such that, when installed in the chassis 204, the first plurality of coupling members 310(1)-310(n) are couplable to the first cassette 210(1).

The shuttle 212 includes a second side 312, opposite the first side 306, that extends the length 308 between the front end 302 and the back end 304. A second plurality of coupling members 314(1), 314(2), 314(3), and 314(n) are disposed along the second side 312 of the shuttle 212 such that, when installed in the chassis 204, the second plurality of coupling members 314(1)-314(n) are couplable to the second cassette 210(2). While FIG. 3 illustrates the first and second sides 306 and 312 including four coupling members disposed along the first and second sides 306 and 312, the first and second sides 306 and 312 may include any number of coupling members disposed along the first and second sides 306 and 312. When the first plurality of coupling members 310(1)-310(n) are coupled to the first cassette 210(1) and the second plurality of coupling members 314(1)-314(n) are coupled to the second cassette 210(2), the first cassette 210(1) and the second cassette 210(2) are coplanar (discussed in more detail below). Moreover, while FIG. 3 illustrates the first and second sides 306 and 312 including coupling members disposed along the first and second sides 306 and 312, the first and second sides 306 and 312 may be void of coupling members. For example, the first and second sides 306 and 312 of the shuttle 212 may be integrally formed with first and second cassettes.

FIG. 3 illustrates the shuttle 212 includes a base portion 316 spanning between the first side 306 of the shuttle 212 and the second side 312 of the shuttle 212. The shuttle 212 includes a slot 318 defined within the base portion 316 and arranged between the first side 306 of the shuttle 212 and the second side 312 of the shuttle 212. The slot 318 extends from the back end 304 of the shuttle 212 along a portion of the length 308 of the shuttle 212 to a point 320 proximate to the front end 302 of the shuttle 212 such that the base portion 316 at the back end 304 of the shuttle 212 is separated between the first side 306 of the shuttle 212 and the second side 312 of the shuttle 212. The slot 318 is sized to slideably receive therein a mounting structure disposed fixedly in the chassis 204. For example, the slot 318 may be sized to releasably engage and receive therein a mounting structure disposed fixedly in the chassis 204. The shuttle 212 may include one or more latching members 322(1) and 322(n) disposed with the slot 318 configured to releasably engage with one or more cooperating latching members disposed in the mounting structure disposed in the chassis 204. For example, the one or more latching members 322(1) and 322(n) may include projections, protrusions, bumps, nodules, ridges, etc. that extend from free ends of flexible arms, hinged at fixed ends opposite the free ends. The one or more latching members are thus configured to flex outward to be releasably engaged with the one or more correspondingly, inversely-shaped cooperating latching members disposed in the mounting structure. In an alternative embodiment (not shown), the one or more latching members 322(1) and 322(n) may be detents, openings, holes, pockets, apertures, grooves, recesses, etc. configured to be releasably engaged with the one or more cooperating latching members disposed in the mounting structure. While FIG. 3 illustrates the one or more latching members 322(1) and 322(n) disposed with the shuttle 212, the one or more latching members may not be disposed with the shuttle 212. For example, one or more latching members may be disposed with a cover (not shown) and configured to be releasably engaged with the one or more correspondingly, inversely-shaped cooperating latching members disposed in the mounting structure. For example, one or more latching members may be disposed with a slot defined within the cover and configured to be releasably engaged with the one or more correspondingly, inversely-shaped cooperating latching members disposed in the mounting structure.

FIG. 3 illustrates the shuttle 212 includes a handle 324 extending from the front end 302 of the shuttle 212. The handle 324 extends from the front end 302 of the shuttle 212 in front of the slot 318. The handle 324 may be an elongated slender member integrally formed with the front end 302 of the shuttle 212. The handle 324 is configured to displace the shuttle 212 relative to the chassis 204 such that the slot 318 slideably receives the mounting structure disposed in the chassis 204. For example, the handle 324 may be configured to displace the shuttle 212 relative to the chassis 204 such that the slot 318 is releasably engageable with the mounting structure disposed in the chassis 204. The handle 324 may include a passageway 326 for receiving fiber optic cables. For example, the handle 324 may include the passageway 326 for receiving fiber optic cables optically coupled to the plurality of connectors 214(1)-214(n) and 216(1)-216(n) and/or the first and second input stations 218(1) and 218(2) disposed in the front of the one or more cable routing storage assemblies 206. The passageway 326 is disposed in a free end of the handle 324 attached to the front end 302 of the shuttle 212. The passageway 326 may be disposed along a longitudinal length of the handle 324. The passageway 326 may include a slot disposed in the handle 324 to provide passage of the fiber optic cables into the passageway 326. The passageway 326 may be defined by a first horizontal arm opposing a second horizontal arm, each having respective smooth and planar surfaces facing each other. While FIG. 3 illustrates the passageway 326 having a rectangular shape, the passageway 326 may have other shapes. For example, the passageway 326 may have a curvilinear shape.

The shuttle 212 includes the first input station 218(1) disposed in the front end 302 of the shuttle 212. When the first cassette 118(1) is disposed with the shuttle 212, the first input station 218(1) is disposed adjacent to the first plurality of connectors 214(1)-214(n) fastened in the first end of the first cassette 118(1). For example, when the first cassette 118(1) is releasably engaged with the shuttle 212, the first input station 218(1) is disposed adjacent to the first plurality of connectors 214(1)-214(n) fastened in the first end of the first cassette 118(1). The first input station 218(1) may be for fastening to an adapter, a pre-terminated fiber tail, or a strain relief mechanism (discussed in more detail below). The shuttle 212 may include a second input station 218(2) disposed in the front end 302 of the shuttle 212. When the second cassette 118(2) is disposed with the shuttle 212, the second input station 218(2) is disposed adjacent to the second plurality of connectors 216(1)-216(n) fastened in the first end of the second cassette 118(2). For example, when the second cassette 118(2) is releasably engaged with the shuttle 212, the second input station 218(2) is disposed adjacent to the second plurality of connectors 216(1)-216(n) fastened in the first end of the second cassette 118(2). The second input station 218(2) may be for fastening an adapter, a pre-terminated fiber tail, or a strain relief mechanism (discussed in more detail below).

Figure 4:
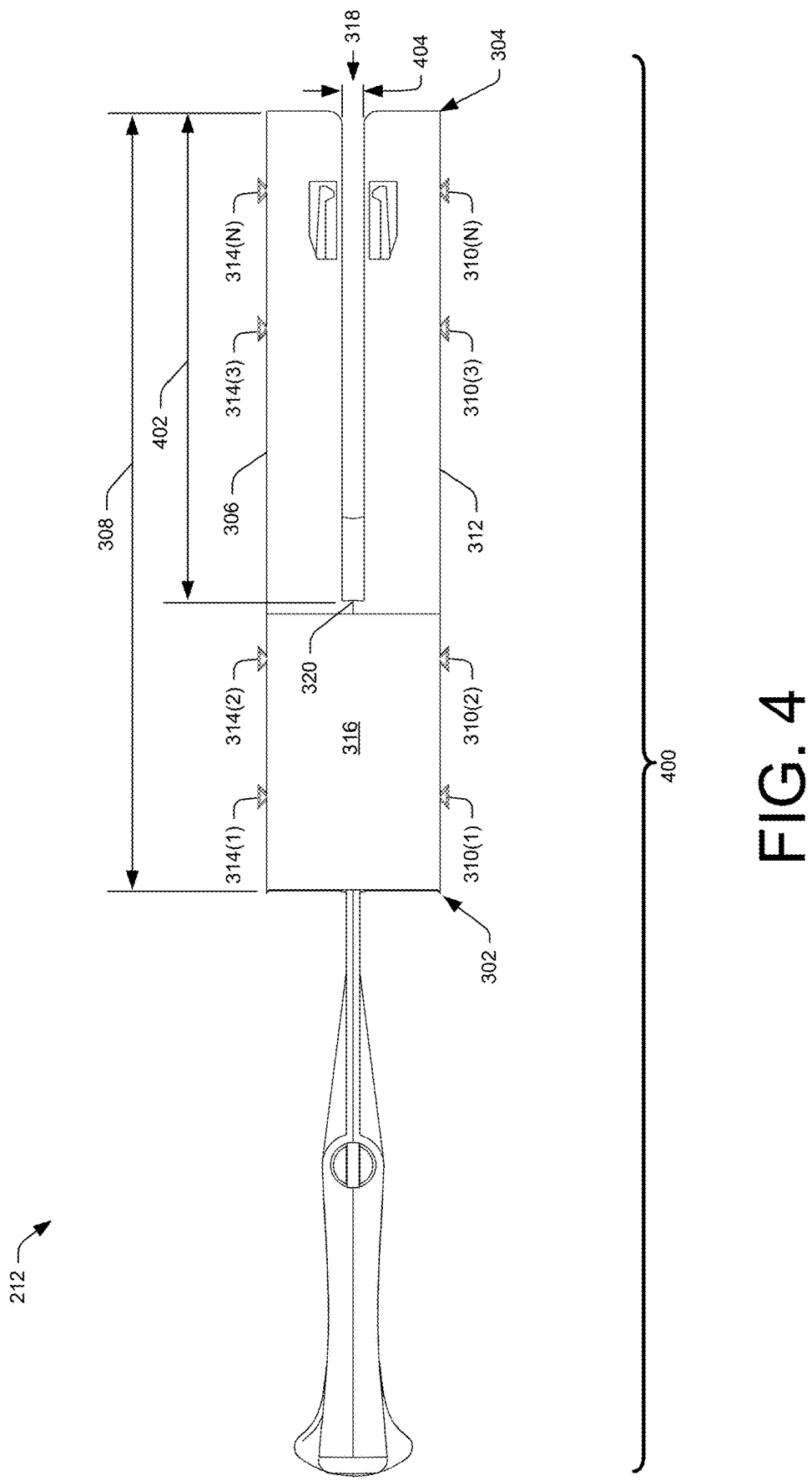
FIG. 4 illustrates a bottom view of the shuttle illustrated in FIG. 3 according to an embodiment of this disclosure.

FIG. 4 illustrates a bottom view 400 of the shuttle 212 illustrated in FIGS. 2 and 3 according to an embodiment of this disclosure. FIG. 4 illustrates the slot 318 defined within the base portion 316 of the shuttle 212 and arranged between the first side 306 of the shuttle 212 and the second side 312 of the shuttle 212. The slot 318 extending from the back end 304 of the shuttle 212 along a portion 402 of the length 308 of the shuttle 212 to the point 320 proximate to the front end 302 of the shuttle 212 such that the base portion 316 at the back end 304 of the shuttle 212 is separated by a distance 404 between the first side 306 and the second side 312.

FIG. 4 illustrates the first plurality of coupling members 310(1)-310(n) and the second plurality of coupling members 314(1)-314(n) may be a plurality of projections, protrusions, bumps, nodules, ridges, etc. configured to be releasably engaged with one or more cooperating coupling members (e.g., detents, openings, holes, pockets, apertures, grooves, notches, recesses, etc.) disposed in the first and second cassettes 210(1) and 210(2). For example, the first plurality of coupling members 310(1)-310(n) and the second plurality of coupling members 314(1)-314(n) may be a plurality of tapered projections which releasably engage with one or more cooperating notches or recesses disposed in the first and second cassettes 210(1) and 210(2).

Figure 5:
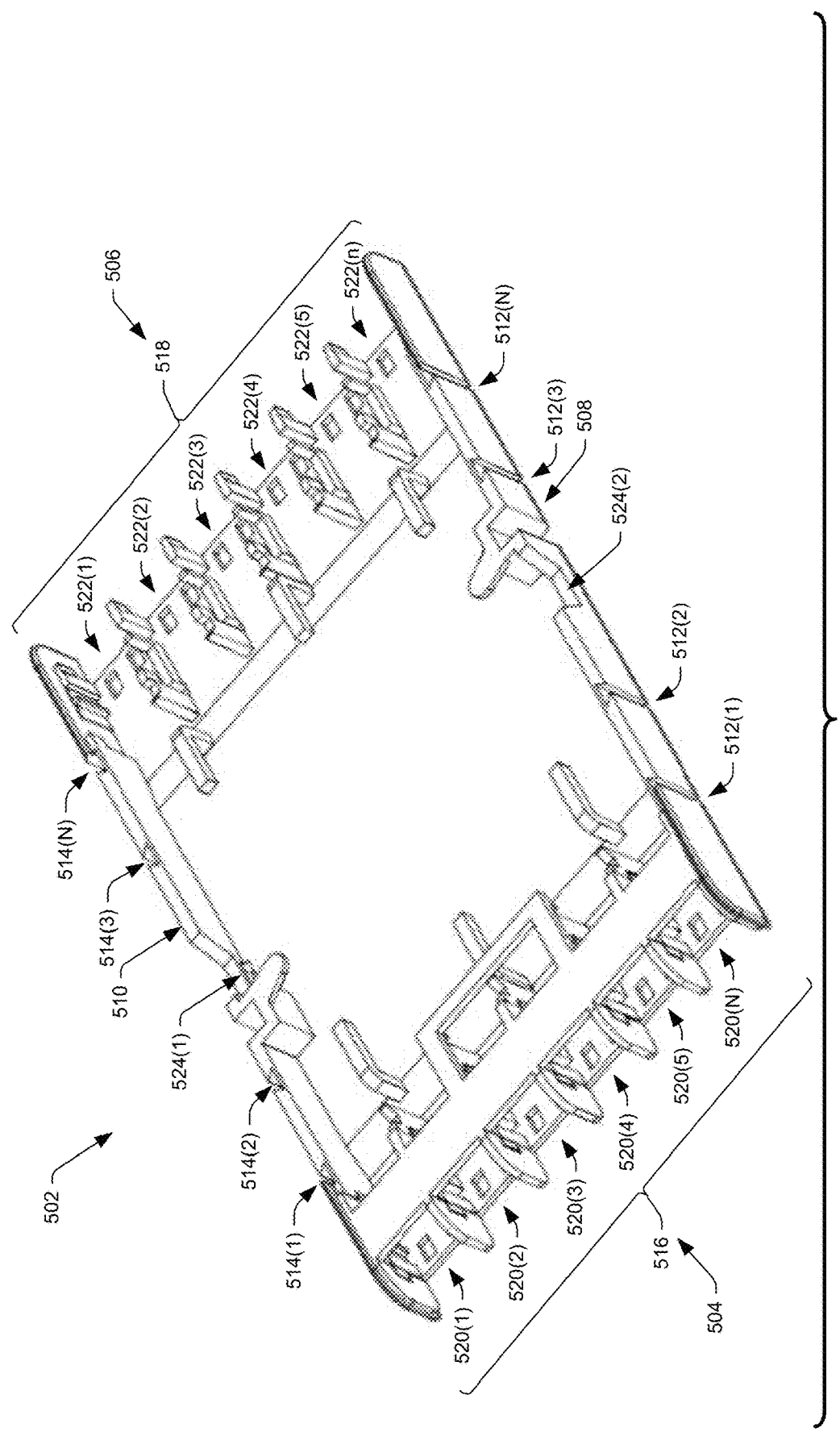
FIG. 5 illustrates a top perspective view of an example cassette useable in the data communication system illustrated in FIG. 2 according to an embodiment of this disclosure.

FIG. 5 illustrates a top perspective view 500 of an example cassette 502 useable in the data communication system illustrated in FIG. 2 according to an embodiment of this disclosure. The cassette 502 is similar to the first and second cassettes 118(1), 118(2), 210(1) and 210(2). Inasmuch as other components of the cassette 502 are similar to those of first and second cassettes 118(1), 118(2), 210(1) and 210(2), the reference numbers remain the same on the same parts for convenience.

The cassette 502 may have a first end 504 opposite a second end 506, a first side 508 arranged between the first end 504 of the cassette 502 and the second end 506 of the cassette 502, and a second side 510 arranged between the first end 504 of the cassette 502 and the second end 506 of the cassette 502. The first end 504 of the cassette 502 may have a first geometry symmetrical, about at least one axis, to a second geometry of the second end 506 of the cassette 502. For example, the first geometry may have a shape and relative arrangement of fastening features, structures, members, receptacles, etc. that are substantially the same as a shape and relative arrangement of fastening features, structures, members, receptacles, etc. of the second geometry. Further, the shapes and relative arrangements of fastening features, structures, members, receptacles, etc. of both of the first geometry and the second geometry may be symmetrically arranged, about an X-axis, a Y-axis, and/or a Z-axis of the cassette. For example, the first geometry may have a length, a width, a height, and a plurality of receptacles that are substantially the same as a length, a width, a height and a plurality of receptacles of the second geometry that may be symmetrically arranged about an X-axis, a Y-axis, and/or a Z-axis of the cassette. (See for example, PCT Application No. PCT/US17/60406, filed Nov. 7, 2017, entitled "Configurable Fiber Cassette," which is hereby incorporated by reference in its entirety.) The symmetry of the cassette 502 allows for the use of both of the first end 504 and the second end 506 of the cassette 502 and configure the cassette 502 based at least in part on a type of a data communication system.

A first plurality of cooperating coupling members 512(1), 512(2), 512(3), and 512(n) may be disposed along the first side 508 of the cassette 502, and a second plurality of cooperating coupling members 514(1), 514(2), 514(3), and 514(n) may be disposed on the second side 510 of the cassette 502. The first plurality of cooperating coupling members 512(1)-512(n) on the first side 508 of the cassette 502 are couplable (e.g., interlock, snap fit, press fit, interference fit, etc.) with the first plurality of coupling members 310(1)-310(n) disposed along the first side 306 of the shuttle 212 and/or the second plurality of coupling members 314(1)-314(n) disposed along the second side 312 of the shuttle 212.

The second plurality of cooperating coupling members 514(1)-514(n) on the second side 510 of the cassette 502 are couplable (e.g., interlock, snap fit, press fit, interference fit, etc.) with the second plurality of coupling members 314(1)-314(n) disposed along the second side 312 of the shuttle 212 and/or the first plurality of coupling members 310(1)-310(n) disposed along the first side 306 of the shuttle 212. The first plurality of cooperating coupling members 512(1)-512(n) and/or the second plurality of cooperating coupling members 514(1)-514(n) may be detents, openings, holes, pockets, apertures, grooves, notches, recesses, etc. For example, first plurality of cooperating coupling members 512(1)-512(n) and/or the second plurality of cooperating coupling members 514(1)-514(n) may be a plurality of tapered notches or recesses which releasably engage with one or more cooperating tapered projections or protrusions disposed along the first and second sides 306 and 312 of the shuttle 212. While FIG. 5 illustrates the cassette 502 includes cooperating coupling members disposed along first and second sides of the cassette 502, the cassette 502 may be void of cooperating coupling members. For example, the first side 508 or the second side 510 of the cassette 502 may be integrally formed with the first side 306 or the second side 312 of the shuttle 212.

A first input station 516 may be arranged in the first end 504 of the cassette 502. A second input station 518 may be arranged in the second end 506 of the cassette 502. The first input station 516 may include a first plurality of receptacles 520(1), 520(2), 520(3), 520(4), 520(5), and 520(n). Each of the first plurality of receptacles 520(1)-520(n) is configured to fasten at least one of a first connector, a first adapter, a first plug, or a first strain relief unit. The first plurality of receptacles 520(1)-520(n) are configured to fasten the plurality of connectors 214(1)-214(n) of FIG. 2 to the cassette 502.

The second input station 518 may include a second plurality of receptacles 522(1), 522(2), 522(3), 522(4), 522(5), and 522(n). Each of the second plurality of receptacles 522(1)-522(n) is configured to fasten at least one of a second connector, a second adapter, a second plug, or a second strain relief unit. The second plurality of receptacles 522(1)-522(n) are configured to fasten the plurality of connectors 216(1)-216(n) of FIG. 2 to the cassette 502.

Because the first and second input stations 516 and 518 of the cassette 502 may be populated with any one of a plurality of optical fiber interfaces (e.g., connectors, adapters, plugs, strain relief units, etc.) the cassette 502 may be modular in that the cassette 502 is easily configured based at least in part on a particular type of data communication system the cassette 502 is to be installed in by simply populating the first and second input stations 516 and 518 with a desired set of optical fiber interfaces that correlates to the particular type of data communication system. The cassette 502 may include one or more passageways 524(1) and 524(2) disposed in sidewalls of the cassette 502 for receiving fiber optic cables. For example the cassette 502 may include one or more passageways 524(1) and 524(2) disposed in sidewalls of the cassette 502 for receiving fiber optic cables from optical fiber interfaces (e.g., adapters (e.g., MPO adapters), pre-terminated fiber tails, or strain relief mechanisms) fastened in the first and second input stations 218(1) and 218(2) disposed in front ends of the shuttles 212.

Figure 6:
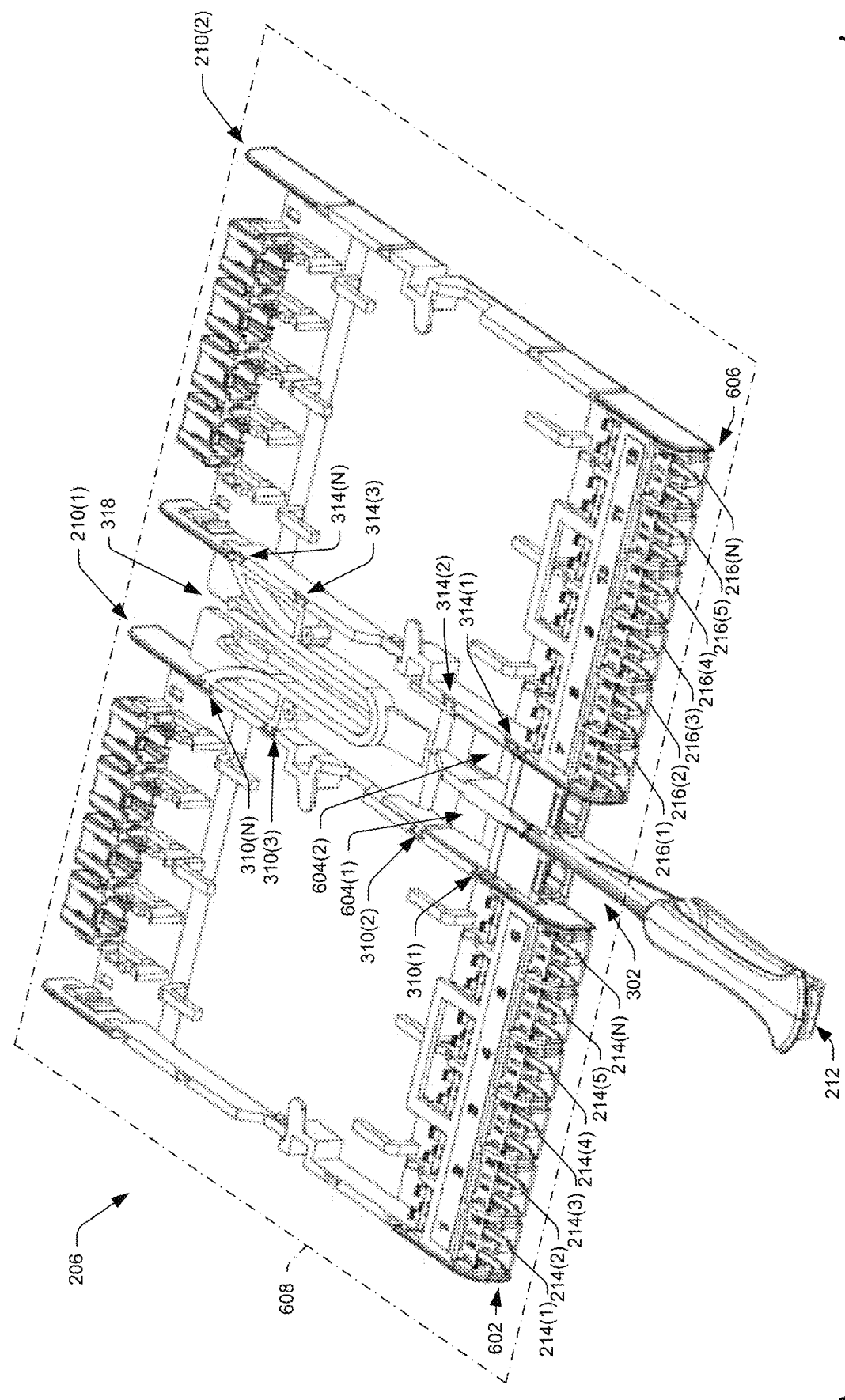
FIG. 6 illustrates a top perspective view of a cable routing storage assembly useable in the data communication system illustrated in FIG. 2 according to an embodiment of this disclosure.

FIG. 6 illustrates a top perspective view 600 of one of the one or more cable routing storage assembly 206 of FIG. 2 according to an embodiment of this disclosure. FIG. 6 illustrates when the shuttle 212 is disposed with the first cassette 210(1), the first plurality of connectors 214(1)-214(n) are fastened in a first end 602 of the first cassette 210(1) such that the first plurality of connectors 214(1)-214(n) are disposed proximate to the front end 302 of the shuttle 212 such that the first plurality of connectors 214(1)-214(n) are accessible at the front end 302 of the shuttle 212. For example, when the first plurality of coupling members 310(1)-310(n) of the shuttle 212 are coupled to the first cassette 210(1), the first plurality of connectors 214(1)-214(n) are fastened in a first end 602 of the first cassette 210(1) such that the first plurality of connectors 214(1)-214(n) are disposed proximate to the front end 302 of the shuttle 212 such that the first plurality of connectors 214(1)-214(n) are accessible at the front end 302 of the shuttle 212

Moreover, when the shuttle 212 is disposed with the first cassette 210(1), the first plurality of connectors 214(1)-214(n) are fastened in the first end 602 of the first cassette 210(1) such that the first plurality of connectors 214(1)-214(n) are disposed in the first end 602 of the cassette 210(1) adjacent to the first input station 218(1) disposed in the front end of the shuttle 212. A first optical fiber interface 604(1) (e.g., a first adapter, a first pre-terminated fiber tail, or a strain relief mechanism) may be fastened in the first input station 218(1) of the shuttle 212. When the shuttle 212 is disposed with the first cassette 210(1), the first plurality of connectors 214(1)-214(n) are fastened in the first end 602 of the first cassette 210(1) such that the first plurality of connectors 214(1)-214(n) are disposed in the first end 602 of the cassette 210(1) adjacent to the first optical fiber interface 604(1) fastened in the first input station 218(1).

FIG. 6 illustrates when the shuttle 212 is disposed with the second cassette 210(2), the second plurality of connectors 216(1)-216(n) are fastened in a first end 606 of the second cassette 210(2) such that the second plurality of connectors 216(1)-216(n) are disposed proximate to the front end 302 of the shuttle 212 such that the second plurality of connectors 216(1)-216(n) are accessible at the front end 302 of the shuttle 212. For example, when the second plurality of coupling members 314(1)-314(n) of the shuttle 212 are coupled to the second cassette 210(2), the second plurality of connectors 216(1)-216(n) are fastened in a first end 606 of the second cassette 210(2) such that the second plurality of connectors 216(1)-216(n) are disposed proximate to the front end 302 of the shuttle 212 such that the second plurality of connectors 216(1)-216(n) are accessible at the front end 302 of the shuttle 212.

Moreover, when the shuttle 212 is disposed with the second cassette 210(2), the second plurality of connectors 216(1)-216(n) are fastened in the first end 606 of the second cassette 210(2) such that the second plurality of connectors 216(1)-216(n) are disposed in the first end 606 of the second cassette 210(2) adjacent to the second input station 218(2) disposed in the front end 302 of the shuttle 212. A second optical fiber interface 604(2) (e.g., a second adapter, a second pre-terminated fiber tail, or a second strain relief mechanism) may be fastened in the second input station 218(2) of the shuttle 212. When the shuttle 212 is disposed with the second cassette 210(2), the second plurality of connectors 216(1)-216(n) are fastened in the first end 606 of the second cassette 210(2) such that the second plurality of connectors 216(1)-216(n) are disposed in the first end 606 of the second cassette 210(2) adjacent to the second optical fiber interface 604(2) fastened in the second input station 218(2). The first and second optical fiber interfaces 604(1) and 604(2) may provide for connecting first and second fiber optic input bundles with the first and second plurality of connectors 214(1)-214(n) and 216(1)-216(n) fastened in the first and second ends 602 and 606 of the first and second cassettes 210(1) and 210(2).

FIG. 6 illustrates when the first plurality of coupling members 310(1)-310(n) are coupled to the first cassette 210(1) and the second plurality of coupling members 314(1)-314(n) are coupled to the second cassette 210(2), the first cassette 210(1) and the second cassette 210(2) are coplanar in plane 608. The shuttle 212 is cantilevered to the first cassette 210(1) and the second cassette 210(2). For example, the shuttle 212 is cantilevered to the first cassette 210(1) via the first plurality of coupling members 310(1)-310(n) that are coupled to the first cassette 210(1) and the second plurality of coupling members 314(1)-314(n) that are coupled to the second cassette 210(2). The first plurality of coupling members 310(1)-310(n) of the shuttle 212 are coupled to the first cassette 210(1) on the first side 306 of the shuttle 212 such that first plurality of coupling members 310(1)-310(n) of the shuttle 212 support the first cassette 210(1) extending from the first side 306 of the shuttle 212.

The second plurality of coupling members 314(1)-314(n) of the shuttle 212 are coupled to the second cassette 210(2) on the second side 312 of the shuttle 212 such that the second plurality of coupling members 314(1)-314(n) of the shuttle 212 support the second cassette 210(2) extending from the second side 312 of the shuttle 212. The first and second coupling members 310(1)-310(n) and 314(1)-314(n) of the shuttle 212 supporting the first and second cassettes 210(1) and 210(2) in tension between the first and second coupling members 310(1)-310(n) and 314(1)-314(n) and the first and second cassettes 210(1) and 210(2). When the slot 318 releasably engages with a mounting structure disposed in a chassis, the mounting structure supports the shuttle 212 supporting the first and second cassettes 210(1) and 210(2) in the chassis. When the slot 318 releasably engages with the mounting structure disposed in the chassis, the shuttle 212 supports the first and second cassettes 210(1) and 210(2) horizontally in the chassis.

Figure 7:
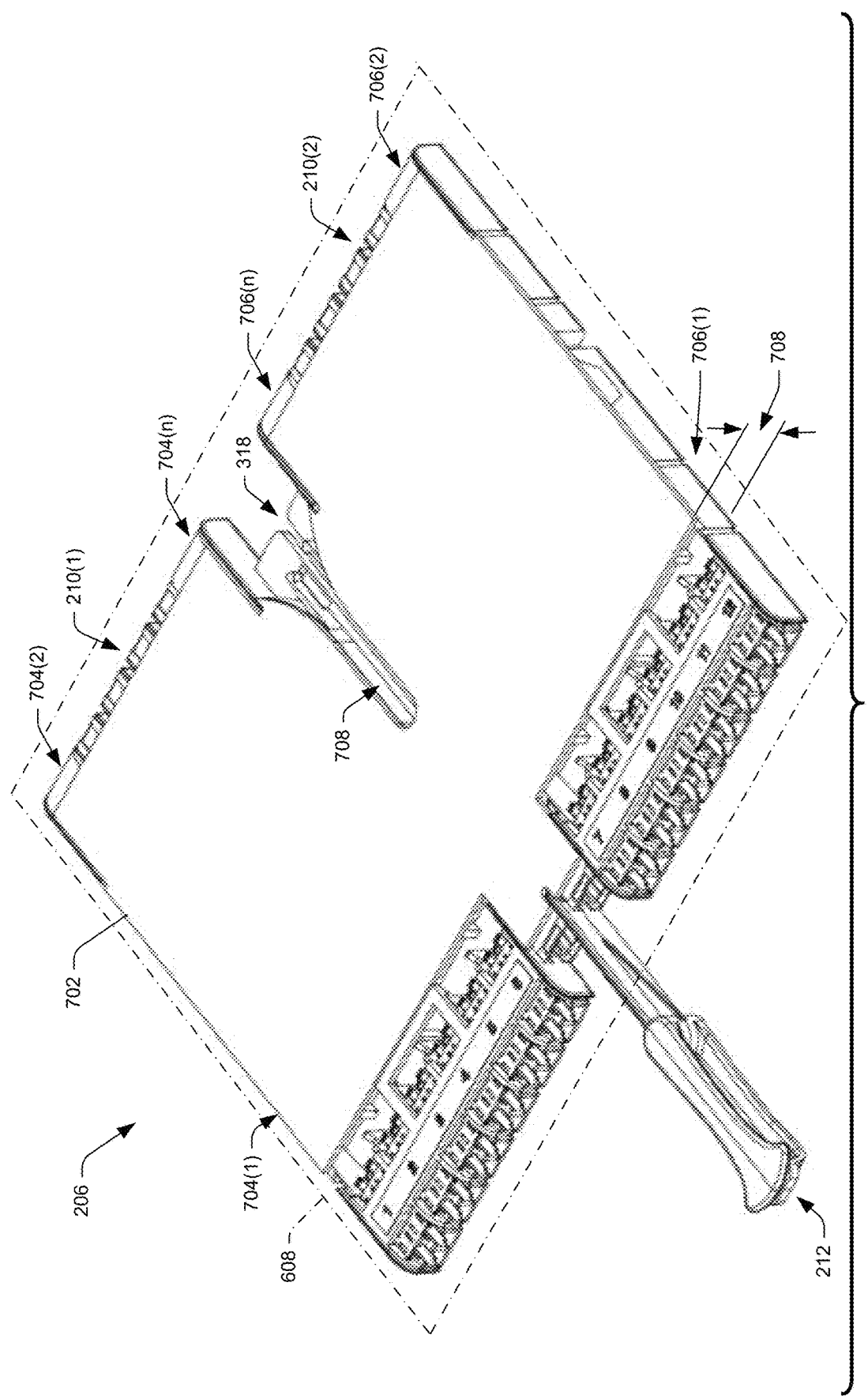
FIG. 7 illustrates the cable routing storage assembly illustrated in FIG. 6 with a cover according to an embodiment of this disclosure.

FIG. 7 illustrates a perspective view 700 the cable routing storage assembly 206 illustrated in FIG. 6 with a cover 702 according to an embodiment of this disclosure. The cover 702 includes a first plurality of attachment members 704(1), 704(2), and 704(n) attachable to the first cassette 210(1) and a second plurality of attachment members 706(1), 706(2), and 706(n) attachable to the second cassette 210(2). When the first plurality of attachment members 704(1)-704(n), are attached to the first cassette 210(1) and the second plurality of attachment members 706(1)-706(n) are attached to the second cassette 210(2), the cover 702 may provide support for the first cassette 210(1) and the second cassette 210(2) coupled to the shuttle 212.

For example, because the cover 702 extends over the shuttle 212 and the first and second cassettes 210(1) and 210(2) coupled to the shuttle 212, the cover 702 provides additional stability to the first cassette 210(1) and the second cassette 210(2) coupled to the shuttle 212. The cover 702 may provide support for the first cassette 210(1) and the second cassette 210(2) coupled to the shuttle 212 such that the cover 702 keeps the first cassette 210(1) and the second cassette 210(2) coupled to the shuttle 212 coplanar to each other in the plane 608. The cable routing storage assembly 206, includes the shuttle 212, the first cassette 210(1), the second cassette 210(2), and the cover 702 having a height 708 ranging from about 0.4 inches to about 0.6 inches. The shuttle 212 having the height 708 ranging from about 0.4 inches to about 0.6 inches, the first cassette 210(1) having the height 708 ranging from about 0.4 inches to about 0.6 inches, and the second cassette 210(2) having the height 708 ranging from about 0.4 inches to about 0.6 inches. The cover 702 includes a slot 708 defined within the cover and arranged between first and second sides of the cover. The slot 708 extends from a back end of the cover 702 along a portion of a length of the cover to a point proximate to a front end of the cover such that the cover 702 at the back end of the cover is separated between the first and second sides of the cover. The slot 708 is sized to receive therein a mounting structure disposed fixedly in the chassis 204.

While FIG. 7 illustrates the cover 702 including the first and second plurality of attachment members 704(1)-704(n) and 706(1)-706(n) that are attachable to the first and second cassettes 210(1) and 210(2), the cover 702 may include one or more attachment members that are attachable to the shuttle 212. For example, the cover 702 may include one or more attachment members that are attachable to portions of the front end 302 of the shuttle 212 and/or one or more attachment members that are attachable to portions of the back end 304 of the shuttle 212.

Figure 8:
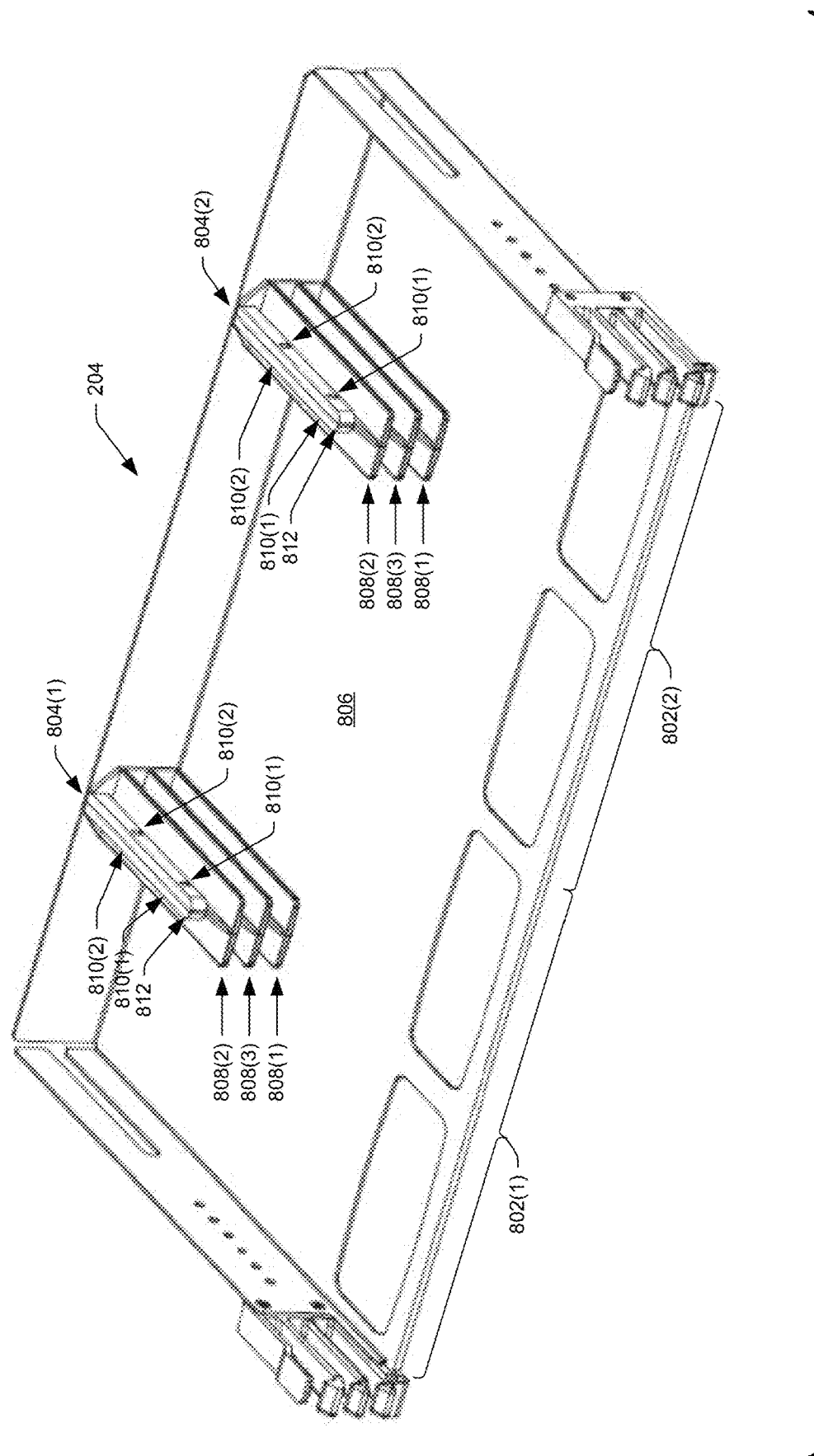
FIG. 8 illustrates a top perspective view of an example data communication system chassis useable in the data communication system illustrated in FIG. 2 according to an embodiment of this disclosure.

FIG. 8 illustrates a top perspective view 800 of the chassis 204 of FIG. 2 according to an embodiment of this disclosure. The chassis 204 is sized to be accommodated in the frame 202 of FIG. 2. The chassis 204 includes a left access side 802(1) and a right access side 802(2). A first mounting structure 804(1) is disposed in the left access side 802(1) and a second mounting structure 804(2) is disposed in the right access side 802(2). The first and second mounting structures 804(1) and 804(2) are fastened to a bottom surface 806 of the chassis 204. Each of the first and second mounting structures 804(1) and 804(2) for engaging with a cable routing storage assembly (e.g., cable routing storage assembly 114 or cable routing storage assembly 206). Each of the first and second mounting structures 804(1) and 804(2) includes at least a lower guide member 808(1) disposed below an upper guide member 808(2). Moreover, in an embodiment, each of the first and second mounting structures 804(1) and 804(2) may further include a middle guide member 808(3).

The lower guide member 808(1) of the first mounting structure 804(1) may be at the same elevation flush with or above (as depicted) the bottom surface 806 of the chassis 204 as the lower guide member 808(1) of the second mounting structure 804(2). The upper guide member 808(2) of the first mounting structure 804(1) may be at the same elevation above the bottom surface 806 of the chassis 204 as the upper guide member 808(2) of the second mounting structure 804(2). The middle guide member 808(3) of the first mounting structure 804(1) may be at the same elevation above the bottom surface 806 of the chassis 204 as the middle guide member 808(3) of the second mounting structure 804(2). Each of the lower, upper, and middle guide members 808(1), 808(2), 808(3) may include one or more cooperating latching members 810(1) and 810(2) that are disposed in the first and second mounting structures 804(1) and 804(2).

The one or more cooperating latching members 810(1) and 810(2) may be disposed in both sides of a vertical wall 812 of each of the first and second mounting structures 804(1) and 804(2). While FIG. 8 illustrates the one or more cooperating latching members 810(1) and 810(2) being disposed in the vertical walls 812 of the first and second mounting structures 804(1) and 804(2), the one or more cooperating latching members 810(1) and 810(2) may be disposed in horizontal planar extensions extending orthogonally to the vertical wall 812. For example, the one or more cooperating latching members 810(1) and 810(2) may be disposed in bottom surfaces of horizontal planar extensions extending orthogonally to the vertical wall 812. The vertical wall 812 of each of the first and second mounting structures 804(1) and 804(2) may be a raised wall extending vertically along a central axis from a rear wall of the chassis 204. The lower, upper, and middle guide members 808(1), 808(2), 808(3) may be planar extensions extending orthogonally to the wall 812, where the raised wall extends along the central axis at least partially along the planar extensions. In an embodiment, each of the first and second mounting structures 804(1) and 804(2) may be attached to the floor and/or the rear wall of the chassis 204. In an alternative embodiment, each of the first and second mounting structures 804(1) and 804(2) may be formed integrally with the floor and/or the wall of the chassis 204. The one or more cooperating latching members 810(1) and 810(2) that are disposed in the walls 812 of the first and second mounting structures 804(1) and 804(2) may be one or more detents, openings, holes, pockets, apertures, grooves, recesses, extending laterally inward on the walls 812 etc. configured to be releasably engaged with the one or more latching members 322(1) and 322(n) of the shuttles 212. The one or more cooperating latching members that are disposed in the bottom surfaces of the horizontal planar extensions extending orthogonally to the vertical wall 812 of the first and second mounting structures 804(1) and 804(2) may be one or more detents, openings, holes, pockets, apertures, grooves, recesses, extending upward into the horizontal planar extensions etc. configured to be releasably engaged with the one or more latching members of a cover of the shuttles 212. The cooperating latching members 810(1) and 810(2) may be disposed in the walls 812 of the first and second mounting structures 804(1) and 804(2), and positioned in respective engagement positions to correspond to stopping positions and catch the one or more latching members 322(1) and 322(n), when the shuttle is engaged thereon.

For example, the cooperating latching member 810(1) may provide for a first latching position to position the cable routing storage assembly 206 in a accessible position. Where when in the accessible position the plurality of connectors 214(1)-214(n) and 216(1)-216(n) fastened in the first and second cassettes 210(1) and 210(2) and the first and second optical fiber interfaces 604(1) and 604(2) fastened in the shuttle 212 are positioned a distance outside of the chassis 204 and away from cable routing storage assemblies to provide a user with access to the plurality of connectors 214(1)-214(n) and 216(1)-216(n) and the first and second optical fiber interfaces 604(1) and 604(2). In another example, the cooperating latching member 810(2) may provide for a second latching position to position the cable routing storage assembly 206 in a stowed position. Where, when in the stowed position, the plurality of connectors 214(1)-214(n) and 216(1)-216(n) fastened in the first and second cassettes 210(1) and 210(2) and the first and second optical fiber interfaces 604(1) and 604(2) fastened in the shuttle 212 are positioned inside of the chassis 204 and adjacent to other cable routing storage assemblies in the chassis 204. Similarly, the one or more cooperating latching members may be disposed in the bottom surfaces of the horizontal planar extensions extending orthogonally to the vertical wall 812 of the first and second mounting structures 804(1) and 804(2), and positioned in respective engagement positions to correspond to stopping positions and catch the one or more latching members of a cover of the shuttles 212, when the cover of the shuttle is engaged thereon.

Figure 9:
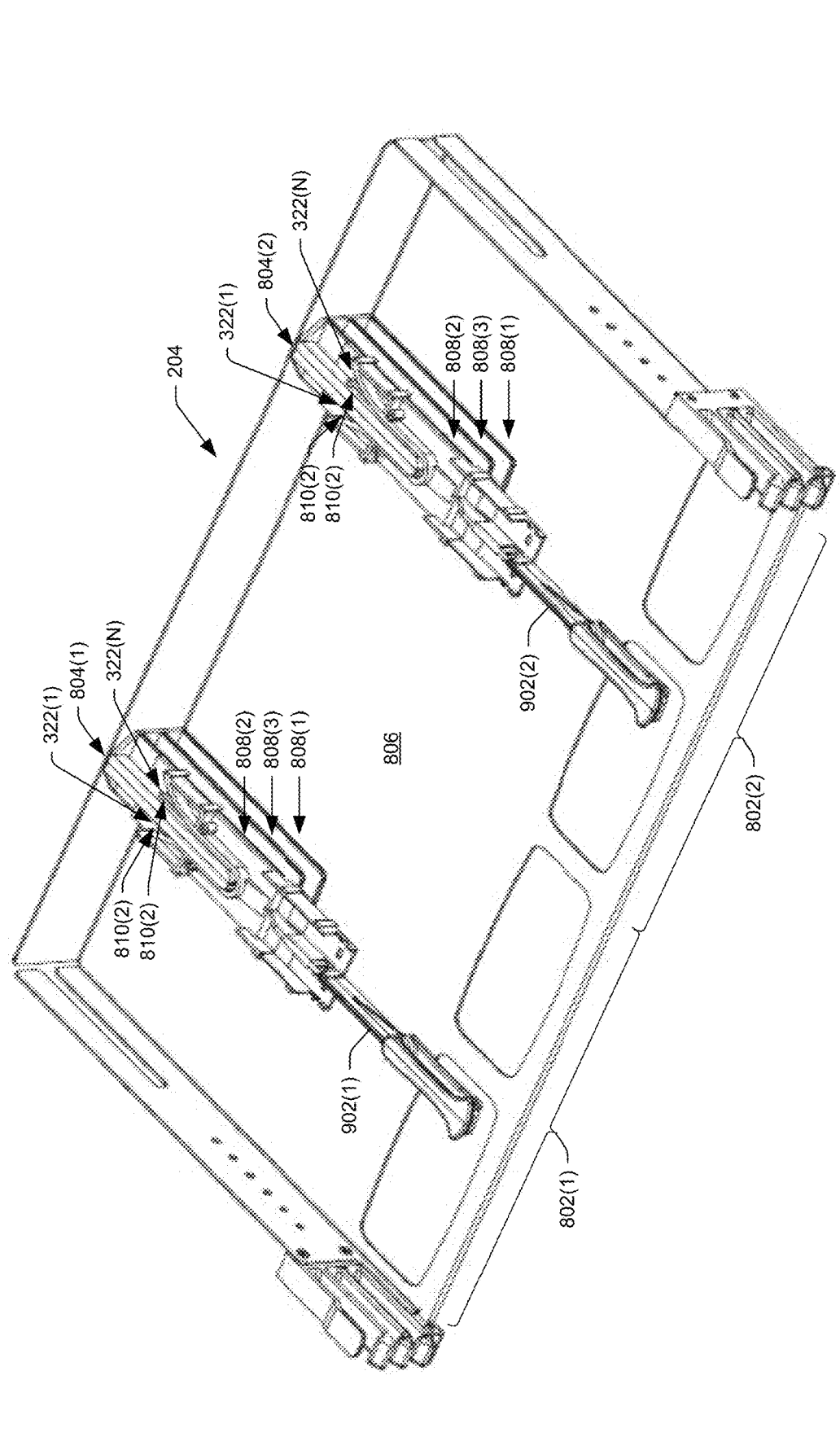
FIG. 9 illustrates the data communication system chassis illustrated in FIG. 8 with a first shuttle and a second shuttle according to an embodiment of this disclosure.

FIG. 9 illustrates a top perspective view 900 of the data communication system chassis 204 of FIG. 2 with a first shuttle 902(1) and a second shuttle 902(2) according to an embodiment of this disclosure. The first and second shuttles 902(1) and 902(2) are similar to the shuttle 212 of FIG. 2. Inasmuch as other components of the first and second shuttles 902(1) and 902(2) are similar to those of the shuttle 212, the reference numbers remain the same on the same parts for convenience.

FIG. 9 illustrates the first shuttle 902(1) disposed in the upper guide member 808(2) of the first mounting structure 804(1). The first shuttle 902(1) disposed in the upper guide member 808(2) where the latching members 322(1) and 322(n) are latched with the cooperating latching members 810(2) of the upper guide member 808(2) of the first mounting structure 804(1). The second shuttle 902(2) disposed in the upper guide member 808(2) where the latching members 322(1) and 322(n) are latched with the cooperating latching members 810(2) of the upper guide member 808(2) of the second mounting structure 804(2).

Figure 10:
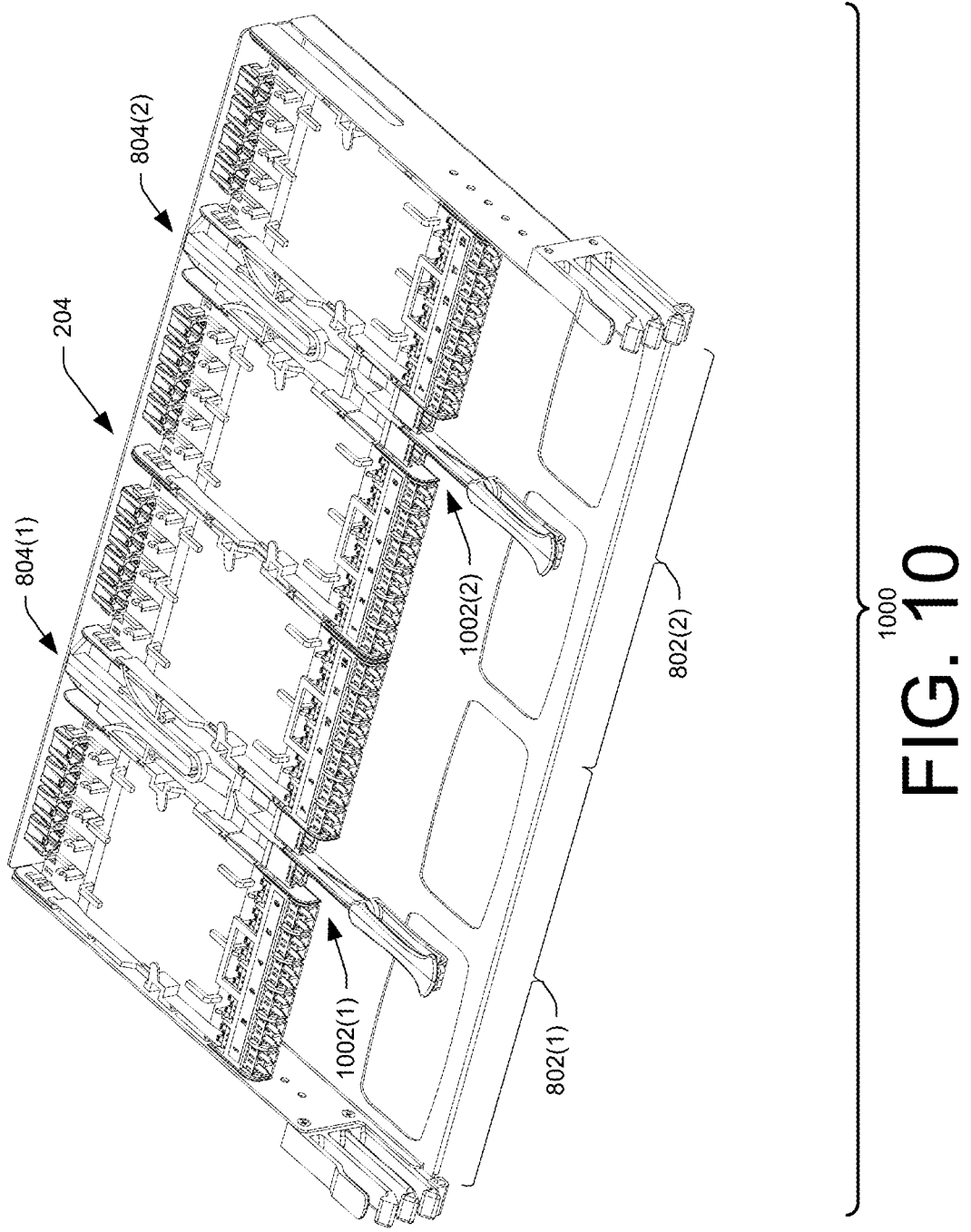
FIG. 10 illustrates the data communication system chassis illustrated in FIG. 8 with a first cable routing storage assembly and a second cable routing storage assembly according to an embodiment of this disclosure.

FIG. 10 illustrates a top perspective view 1000 the data communication system chassis 204 of FIG. 2 with a first cable routing storage assembly 1002(1) and a second cable routing storage assembly 1002(2) according to an embodiment of this disclosure. The first and second cable routing storage assemblies 1002(1) and 1002(2) are similar to the one or more cable routing storage assemblies 114 and 206. Inasmuch as other components of the first and second cable routing storage assemblies 1002(1) and 1002(2) are similar to those of the one or more cable routing storage assemblies 114 and 206, the reference numbers remain the same on the same parts for convenience.

FIG. 10 illustrates the first cable routing storage assembly 1002(1) disposed in the upper guide member 808(2) of the first mounting structure 804(1) and the second cable routing storage assembly 1002(2) is disposed in the upper guide member 808(2) of the second mounting structure 804(2). The first cable routing storage assembly 1002(1) disposed in the upper guide member 808(2) of the first mounting structure 804(1) is coplanar with the second cable routing storage assembly 1002(2) disposed in the upper guide member 808(2) of the second mounting structure 804(2). While FIG. 10 illustrates first and second cable routing storage assemblies 1002(1) and 1002(2) disposed in the first and second mounting structures 804(1) and 804(2), one or more additional cable routing storage assemblies may be disposed in the first and/or the second mounting structures 804(1) and 804(2). For example, at least 2 additional cable routing storage assemblies may be disposed in the first mounting structure 804(1) and at least 2 more additional cable routing storage assemblies may be disposed in the second mounting structure 804(2) via the lower and middle guide members 808(1) and 808(3) of the first and second mounting structures 804(1) and 804(2).

Figure 11:
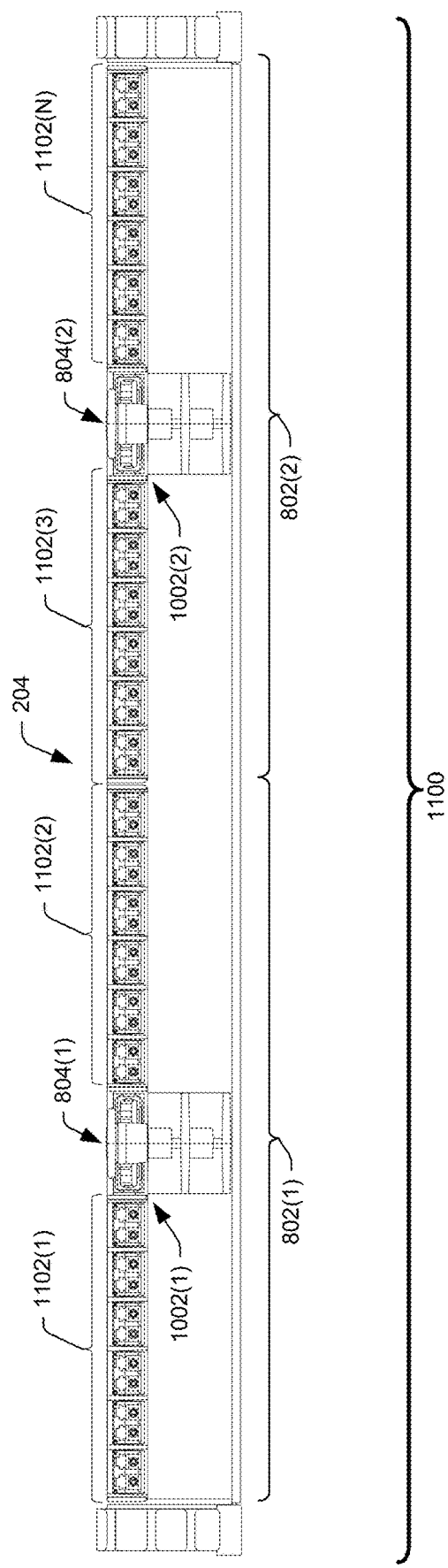
FIG. 11 illustrates a front view of the data communication system chassis illustrated in FIG. 10 according to an embodiment of this disclosure.

FIG. 11 illustrates a front view 1100 of the data communication system chassis 204 of FIG. 2 with the first cable routing storage assembly 1002(1) and the second cable routing storage assembly 1002(2) of FIG. 10 according to an embodiment of this disclosure. FIG. 11 illustrates the first cable routing storage assembly 1002(1) disposed in the upper guide member 808(2) of the first mounting structure 804(1) is coplanar with the second cable routing storage assembly 1002(2) disposed in the upper guide member 808(2) of the second mounting structure 804(2). FIG. 11 illustrates each shuttle 212 of the first and second cable routing storage assembly 1002(1) and 1002(2) includes one or more cassettes 1102(1), 1102(2), 1102(3), and 1102(n) disposed horizontally in the chassis 204. Each shuttle 212 is cantilevered to the one or more cassettes 1102(1)-1102(n) disposed horizontally in the chassis 204.

While FIG. 11 illustrates four cassettes disposed horizontally in the chassis 204, one or more additional cassettes may be disposed horizontally in the chassis 204. For example, eight additional cassettes may be disposed horizontally in the chassis via installing four additional cable routing storage assemblies in the first and second mounting structures 804(1) and 804(2).

Figure 12:
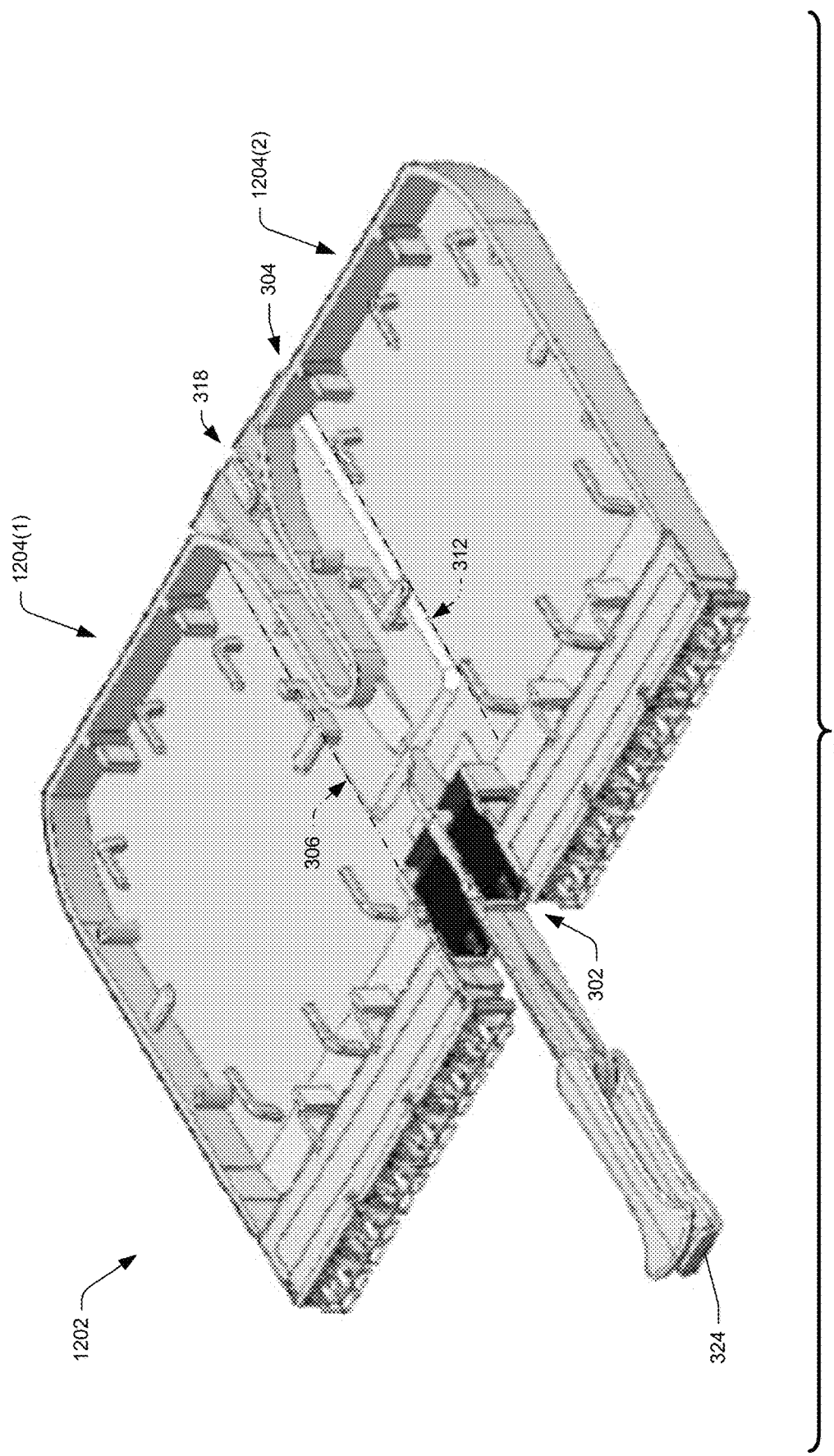
FIG. 12 illustrates a top perspective view of another example shuttle useable in the data communication system illustrated in FIG. 2 according to an embodiment of this disclosure.

FIG. 12 illustrates a top perspective view 1200 of another example shuttle 1202 which may be similar to the shuttle 212 in FIGS. 3 and 4. Inasmuch as other components of the shuttle 1202 are similar to those of the shuttle 212, the reference numbers remain the same on the same parts for convenience. The shuttle 1202 includes the slot 318 and the handle 324 that extends from the front end 302 of the shuttle 212 in front of the slot 318. The shuttle 1202 is shown including a first cassette 1204(1) disposed with the first side 306 of the shuttle 1202 and a second cassette 1204(2) disposed with the second side 312 of the shuttle 1202. For example, the first cassette 1204(1) and the second cassette 1204(2) may both be integrally formed with the shuttle 1202. For example, the first cassette 1204(1) may be formed integrally with the first side 306 of the shuttle 1202 (e.g., injection molded, casted, etc.) and the second cassette 1204(2) may be formed integrally with the second side 312 of the shuttle 1202 (e.g., injection molded, casted, etc.).

Figure 13:
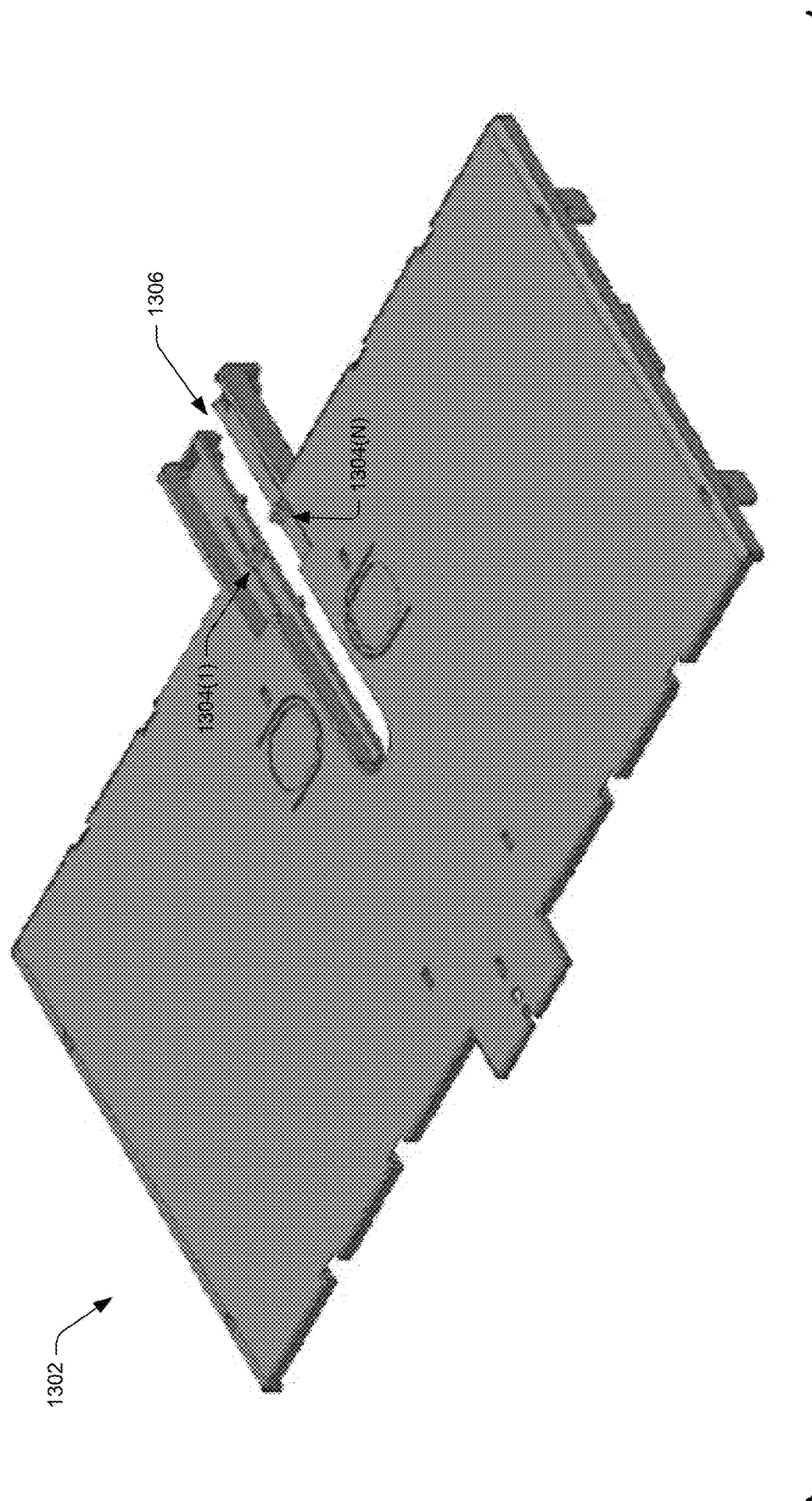
FIG. 13 illustrates a top perspective view of another example cover according to an embodiment of this disclosure.

FIG. 13 illustrates a top perspective view 1300 of another example cover 1302. The cover 1302 may include one or more latching members 1304(1) and 1304(n) disposed with a slot 1306 configured to releasably engage with one or more cooperating latching members disposed in a mounting structure (e.g., mounting structures 804(1) and 804(2)) disposed in the chassis 204. For example, the one or more latching members 1304(1) and 1304(n) may include projections, protrusions, bumps, nodules, ridges, etc. that extend from a middle portion of flexible arms, hinged at fixed ends. The one or more latching members are thus configured to flex downward to be releasably engaged with the one or more correspondingly, inversely-shaped cooperating latching members disposed in the mounting structure. For example, the one or more latching members are thus configured to flex downward to be releasably engaged with the one or more correspondingly, inversely-shaped cooperating latching members disposed in bottom surfaces of horizontal planar extensions extending orthogonally to the vertical wall 812 of the first and second mounting structures 804(1) and 804(2).

FIG. 14 illustrates a perspective view 1400 of another example mounting structure 1402 according to an embodiment of this disclosure. The mounting structure 1402 is similar to the first and second mounting structures 804(1) and 804(2) illustrated in FIGS. 8, 9, 10, and 11. Inasmuch as other components of the mounting structure 1402 are similar to those of the first and second mounting structures 804(1) and 804(2), the reference numbers remain the same on the same parts for convenience.

FIG. 14 illustrates the mounting structure 1402 includes the lower guide member 808(1), middle guide member 808(3), upper guide member 808(2) and vertical wall 812. Each of the lower, upper, and middle guide members 808(1), 808(2), 808(3) may include one or more cooperating latching members 1404(1) and 1404(2) that are disposed in one or more horizontal planar extensions 1406(1) 1406(2), and 1406(n) extending orthogonally to the vertical wall 812. For example, the one or more cooperating latching members 1404(1) and 1404(2) may be disposed in bottom surfaces of the one or more horizontal planar extensions 1406(1)-1406(n) extending orthogonally to the vertical wall 812. The mounting structure 1402 may have a "T" shape cross-sectional profile. For example, the mounting structure 1402 may have a top horizontal portion extending orthogonally to the vertical wall 812 at a top of the vertical wall 812. One or more of the horizontal planar extensions 1406(1)-1406(n) may be disposed on top of the top horizontal portions extending orthogonally to the vertical wall 812, where the one or more cooperating latching members 1404(1) and 1404(2) may be disposed in bottom surfaces of one or more of the top horizontal portions.

Conclusion

Although the invention has been described in language specific to structural features and/or methodological acts, it is to be understood that the invention is not necessarily limited to the specific features or acts described. Rather, the specific features and acts are disclosed as illustrative forms of implementing the invention. For example, while embodiments are described having certain shapes, sizes, and configurations, these shapes, sizes, and configurations are merely illustrative.

What is claimed is:

1. A cable routing storage assembly for a data communication system chassis, the assembly comprising:
    a shuttle including:
        a front end,
        a back end opposite the front end,
        a first side extending a length between the front end and the back end,
        a first coupling member disposed on the first side of the shuttle such that, when installed in the chassis, the first coupling member is couplable to a first cassette,
        a second side, opposite the first side, extending the length between the front end and the back end,
        a second coupling member disposed on the second side of the shuttle such that, when installed in the chassis, the second coupling member is couplable to a second cassette,
        a base portion spanning between the first side of the shuttle and the second side of the shuttle, and
        a slot defined within the base portion and arranged between the first side of the shuttle and the second side of the shuttle, the slot extending from the back end of the shuttle along a portion of the length of the shuttle to a point proximate to the front end of the shuttle such that the base portion at the back end of the shuttle is separated between the first side and the second side, the slot being sized to slideably receive a mounting structure disposed in the chassis,
    wherein, when the first coupling member is coupled to the first cassette and the second coupling member is coupled to the second cassette, the first cassette and the second cassette are coplanar.

2. The cable routing storage assembly of claim 1, further comprising a handle extending from the front end of the shuttle in front of the slot, the handle configured to displace the shuttle relative to the chassis such that the slot is slideably receivable with the mounting structure.

3. The cable routing storage assembly of claim 1 further comprising a handle extending from the front end of the shuttle in front of the slot,
    wherein the handle includes a passageway for receiving fiber optic cables.

4. The cable routing storage assembly of claim 1, further comprising the first cassette, and wherein, when the first coupling member is coupled to the first cassette, a first plurality of connectors fastened in a first end of the first cassette are disposed proximate to the front end of the shuttle such that the first plurality of connectors are accessible at the front end of the shuttle.

5. The cable routing storage assembly of claim 4, further comprising a first input station disposed in the front end of the shuttle adjacent to the first plurality of connectors fastened in the first end of the first cassette, the first input station fastening an adapter, or a pre-terminated fiber tail, and
    wherein the adapter or the pre-terminated fiber tail fastened in the first input station connects a first fiber optic input bundle with the first plurality of connectors fastened in the first end of the first cassette.

6. The cable routing storage assembly of claim 1, further comprising the second cassette, and wherein, when the second coupling member is coupled to the second cassette, a second plurality of connectors fastened in a first end of the second cassette are disposed proximate to the front end of the shuttle such that the second plurality of connectors are accessible at the front end of the shuttle.

7. The cable routing storage assembly of claim 6, further comprising a second input station disposed in the front end of the shuttle adjacent to the second plurality of connectors fastened in the first end of the second cassette, the second input station fastening an adapter, or a pre-terminated fiber tail, and
    wherein the adapter or the pre-terminated fiber tail fastened in the second input station connects a second fiber optic input bundle with the second plurality of connectors fastened in the first end of the second cassette.

8. The cable routing storage assembly of claim 1, further comprising a cover including:
    a first plurality of attachment members attachable to the first cassette, and
    a second plurality of attachment members attachable to the second cassette,
    wherein, when the first plurality of attachment members are attached to the first cassette and the second plurality of attachment members are attached to the second cassette, the cover supports the first cassette and the second cassette coupled to the shuttle, such that the cover keeps the first cassette and the second cassette coupled to the shuttle coplanar to each other.

9. A cable routing storage assembly for a data communication system frame, the assembly comprising:
    a chassis sized to be accommodated in the frame, the chassis including:
        an access side, and
        a mounting structure disposed in the access side; and
    at least one shuttle configured to be installed in the chassis, the at least one shuttle including:
        a first coupling member disposed on a first side of the at least one shuttle such that, when installed in the chassis, the first coupling member is couplable to a first cassette,
        a second coupling member disposed on a second side of the at least one shuttle such that, when installed in the chassis the second coupling member is couplable to a second cassette,
        a base portion spanning between the first side of the at least one shuttle and the second side of the at least one shuttle, and
        a slot defined within the base portion, the slot extending from a back end of the at least one shuttle along a portion of a length of the at least one shuttle to a point proximate to a front end of the at least one shuttle such that the base portion at the back end of the at least one shuttle is separated between the first side and the second side, the slot being sized to slideably receive the mounting structure,
    wherein, when the first coupling member is coupled to the first cassette and the second coupling member is coupled to the second cassette, the first cassette and the second cassette are coplanar, and wherein, when the slot slideably receives the mounting structure, the mounting structure supports the at least one shuttle, the first cassette coupled to the at least one shuttle, and the second cassette coupled to the at least one shuttle in the chassis.

10. The cable routing storage assembly of claim 9, wherein the access side of the chassis is a left access side, the mounting structure is a first mounting structure disposed in the left access side, and the at least one shuttle is a first shuttle, and
wherein the chassis further includes:
a right access side disposed adjacent to the left access side, and
a second mounting structure disposed in the right access side, the second mounting structure for engaging with a second shuttle.

11. The cable routing storage assembly of claim 9, the at least one shuttle including a plurality of shuttles, each shuttle of the plurality of shuttles including one or more cassettes disposed horizontally in the chassis, and each shuttle of the plurality of shuttles being cantilevered to each of the one or more cassettes disposed horizontally in the chassis.

12. The cable routing storage assembly of claim 9, wherein the mounting structure includes at least a lower guide member disposed below an upper guide member, and
wherein the slot of the at least one shuttle is releasably engageable with both the lower guide member and the upper guide member.

13. A cable routing storage assembly for a data communication system chassis, the assembly comprising:
a shuttle including:
a front end,
a back end opposite the front end,
a first side extending a length between the front end and the back end,
a second side, opposite the first side, extending the length between the front end and the back end,
a base portion spanning between the first side of the shuttle and the second side of the shuttle,
a slot defined within the base portion and arranged between the first side of the shuttle and the second side of the shuttle, the slot extending from the back end of the shuttle along a portion of the length of the shuttle to a point proximate to the front end of the shuttle such that the base portion at the back end of the shuttle is separated between the first side and the second side, the slot being sized to slideably receive a mounting structure disposed in the chassis, and
a handle extending from the front end of the shuttle in front of the slot, the handle configured to displace the shuttle relative to the chassis.

14. The cable routing storage assembly of claim 13, wherein the handle includes a passageway for receiving fiber optic cables.

15. The cable routing storage assembly of claim 13, further comprising:
a first cassette disposed with the first side of the shuttle; and
a second cassette disposed with the second side of the shuttle.

16. The cable routing storage assembly of claim 15, further comprising:
the chassis, the chassis being sized to be accommodated in a frame and including:
an access side, and
the mounting structure, the mounting structure disposed in the access side of the chassis,
wherein, when the slot slideably receives the mounting structure, the mounting structure supports the at least one shuttle, the first cassette disposed with the at least one shuttle, and the second cassette disposed with the at least one shuttle in the chassis.

17. The cable routing storage assembly of claim 16, wherein the access side of the chassis is a left access side, the mounting structure is a first mounting structure disposed in the left access side, and the at least one shuttle is a first shuttle, and
wherein the chassis further includes:
a right access side disposed adjacent to the left access side, and
a second mounting structure disposed in the right access side, the second mounting structure for engaging with a second shuttle.

18. The cable routing storage assembly of claim 16, the at least one shuttle including a plurality of shuttles, each shuttle of the plurality of shuttles including one or more cassettes disposed horizontally in the chassis, and each shuttle of the plurality of shuttles being cantilevered to each of the one or more cassettes disposed horizontally in the chassis.

19. The cable routing storage assembly of claim 1, further comprising:
the chassis, the chassis being sized to be accommodated in a frame and including:
an access side, and
the mounting structure, the mounting structure disposed in the access side of the chassis.

20. The cable routing storage assembly of claim 19, wherein the access side of the chassis is a left access side, the mounting structure is a first mounting structure disposed in the left access side, and the shuttle is a first shuttle, and
wherein the chassis further includes:
a right access side disposed adjacent to the left access side, and
a second mounting structure disposed in the right access side, the second mounting structure for engaging with a second shuttle.

* * * * *